(12) United States Patent
Kim et al.

(10) Patent No.: US 12,259,762 B2
(45) Date of Patent: Mar. 25, 2025

(54) HINGE STRUCTURE AND FOLDABLE ELECTRONIC DEVICE INCLUDING THE SAME

(71) Applicant: Samsung Electronics Co., Ltd., Suwon-si (KR)

(72) Inventors: Taejeong Kim, Suwon-si (KR); Jusung Maeng, Suwon-si (KR); Jongkeun Kim, Suwon-si (KR); Chungkeun Yoo, Suwon-si (KR); Jongchan Seok, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 18/082,943

(22) Filed: Dec. 16, 2022

(65) Prior Publication Data

US 2023/0315162 A1  Oct. 5, 2023

Related U.S. Application Data

(63) Continuation of application No. PCT/KR2022/019960, filed on Dec. 8, 2022.

(30) Foreign Application Priority Data

Mar. 29, 2022 (KR) .................. 10-2022-0038928
May 26, 2022 (KR) .................. 10-2022-0064915

(51) Int. Cl.
*G06F 1/16* (2006.01)
*F16C 11/04* (2006.01)
(Continued)

(52) U.S. Cl.
CPC .......... *G06F 1/1681* (2013.01); *F16C 11/045* (2013.01)

(58) Field of Classification Search
CPC .... G06F 1/1681; G06F 1/1675; G06F 1/1616; G06F 1/1618; G06F 1/162; G06F 1/1622; F16C 11/045
See application file for complete search history.

(56) References Cited

U.S. PATENT DOCUMENTS 10,627,873 B2  4/2020  Lan et al.
10,963,020 B2  3/2021  Kim et al.
(Continued)

FOREIGN PATENT DOCUMENTS

CN  112911033 A  6/2021
EP  3 913 901 A1  11/2021
(Continued)

OTHER PUBLICATIONS

International Search Report and written opinion dated Feb. 27, 2023, issued in International Application No. PCT/KR2022/019960.
(Continued)

*Primary Examiner* — Anthony M Haughton
(74) *Attorney, Agent, or Firm* — Jefferson IP Law, LLP

(57) ABSTRACT

According to an embodiment of the disclosure, a foldable electronic device may comprise a hinge structure unit including a first hinge structure and a second hinge structure and a bracket to which the hinge structure unit is rotatably coupled. The first hinge structure or the second hinge structure may include a rotator provided with an interlocking hole and a cam having an end provided with an interlocking protrusion to be fitted into the interlocking hole to be assembled to the rotator.

19 Claims, 28 Drawing Sheets

(51) Int. Cl.
  *H05K 5/00*     (2006.01)
  *H05K 7/00*     (2006.01)

(56) References Cited

U.S. PATENT DOCUMENTS

| | | | |
|---|---|---|---|
| 11,259,428 B2 * | 2/2022 | Kang | H05K 5/0226 |
| 11,339,759 B2 | 5/2022 | Assaf et al. | |
| 11,589,471 B2 | 2/2023 | Zhang et al. | |
| 11,788,330 B2 * | 10/2023 | Kim | E05D 3/18 |
| | | | 16/354 |
| 11,956,378 B2 * | 4/2024 | Kang | F16C 11/04 |
| 11,997,807 B2 * | 5/2024 | Park | F16C 11/045 |
| 12,032,417 B2 * | 7/2024 | Park | H04M 1/0216 |
| 12,066,872 B2 * | 8/2024 | Kim | G06F 1/1652 |
| 2013/0201621 A1 * | 8/2013 | Song | G06F 1/1624 |
| | | | 361/679.27 |
| 2021/0165466 A1 | 6/2021 | Kang et al. | |
| 2021/0365073 A1 | 11/2021 | Cha et al. | |
| 2022/0035422 A1 * | 2/2022 | Torres | G09F 9/301 |

FOREIGN PATENT DOCUMENTS

| | | |
|---|---|---|
| KR | 10-1034577 B1 | 5/2011 |
| KR | 10-2011-0091966 A | 8/2011 |
| KR | 10-2012-0026268 A | 3/2012 |
| KR | 10-1941584 B1 | 1/2019 |
| KR | 10-2020-0101238 A | 8/2020 |
| KR | 10-2020-0126524 A | 11/2020 |
| KR | 10-2250196 B1 | 5/2021 |
| KR | 10-2021-0068880 A | 6/2021 |
| KR | 10-2021-0106869 A | 8/2021 |
| KR | 10-20210149845 A | 12/2021 |
| KR | 10-2503575 B1 | 2/2023 |

OTHER PUBLICATIONS

Extended European Search Report dated Jan. 29, 2025, issued in European Application No. 22935915.3-1218.

* cited by examiner

<B - B>

(a)

(b)

(c)

(a)

(b)

HINGE STRUCTURE AND FOLDABLE ELECTRONIC DEVICE INCLUDING THE SAME

CROSS-REFERENCE TO RELATED APPLICATION(S)

This application is a continuation application, claiming priority under § 365(c), of an International application No. PCT/KR2022/019960, filed on Dec. 8, 2022, which is based on and claims the benefit of a Korean patent application number 10-2022-0038928, filed on Mar. 29, 2022, in the Korean Intellectual Property Office, and of a Korean patent application number 10-2022-0064915, filed on May 26, 2022, in the Korean Intellectual Property Office, the disclosure of each of which is incorporated by reference herein in its entirety.

BACKGROUND

1. Field

The disclosure relates to an electronic device including a hinge structure.

2. Description of Related Art

The electronic device may display images through the display disposed in the housing. The image displayed on the display may include a plurality of pixels. The display may receive a data voltage and a light emission signal for displaying an image from a display driver IC (DDI).

The electronic device may correspond to, e.g., a portable electronic device, such as a smartphone. The portable electronic device may provide functions, such as calling, video playback, and/or Internet search, based on various types of applications. The user desires to be able to use the function provided by the electronic device through a wider screen. Since portability may decrease as the screen becomes larger in the electronic device, there has been developed a structure that is foldable using a folding structure capable of providing a large screen while preventing the degradation of portability.

The above information is presented as background information only to assist with an understanding of the disclosure. No determination has been made, and no assertion is made, as to whether any of the above might be applicable as prior art with regard to the disclosure.

SUMMARY

An electronic device having a foldable structure may include two or more housings (or frames) and a hinge structure that allows the two housings to rotate about two pairs of rotational axes. The hinge structure may include two rotation portions, an interlocking pin for assembling a rotator and a cam constituting each of the two rotation portions or a clip for preventing separation of the interlocking pin. In the hinge structure, the two housings are opened or closed by the two rotation portions rotating at the same angle along the rotational axes, so that the display may be protected without changing the length.

As described above, since the hinge structure requires an interlocking pin and a clip for interlocking the cam and the rotator constituting each of the two rotation portions, a cost rise and deterioration of productivity may occur. Further, to ensure a stable operation of the hinge structure, it may be necessary to manage the dimensional accuracy of the interlocking pin that couples the cam and the rotator constituting each of the two rotation portions.

Aspects of the disclosure are to address at least the above-mentioned problems and/or disadvantages and to provide at least the advantages described below. Accordingly, an aspect of the disclosure is to provide a hinge structure in which the rotation portion is formed by coupling a rotator with a cam by an interlocking protrusion provided in the cam in a foldable electronic device.

Additional aspects will be set forth in part in the description which follows and, in part, will be apparent from the description, or may be learned by practice of the presented embodiments.

According to an embodiment of the disclosure, a foldable electronic device may comprise a hinge structure unit including a first hinge structure and a second hinge structure and a bracket to which the hinge structure unit is rotatably coupled. The first hinge structure or the second hinge structure may include a rotator provided with an interlocking hole and a cam having an end provided with an interlocking protrusion to be fitted into the interlocking hole to be assembled to the rotator.

According to an embodiment of the disclosure, a hinge structure may comprise a bracket, a rotator rotatably connected to the bracket and provided with an interlocking hole, and a cam rotatably connected to the bracket and having an end provided with an interlocking protrusion to be fitted into the interlocking hole to be assembled to the rotator.

According to various embodiments of the disclosure, the rotator is coupled to the interlocking protrusion integrally provided in the cam to thereby form the rotation portion. Thus, it is possible to enhance the productivity and/or quality of the hinge structure including two rotation portions while reducing manufacture costs.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
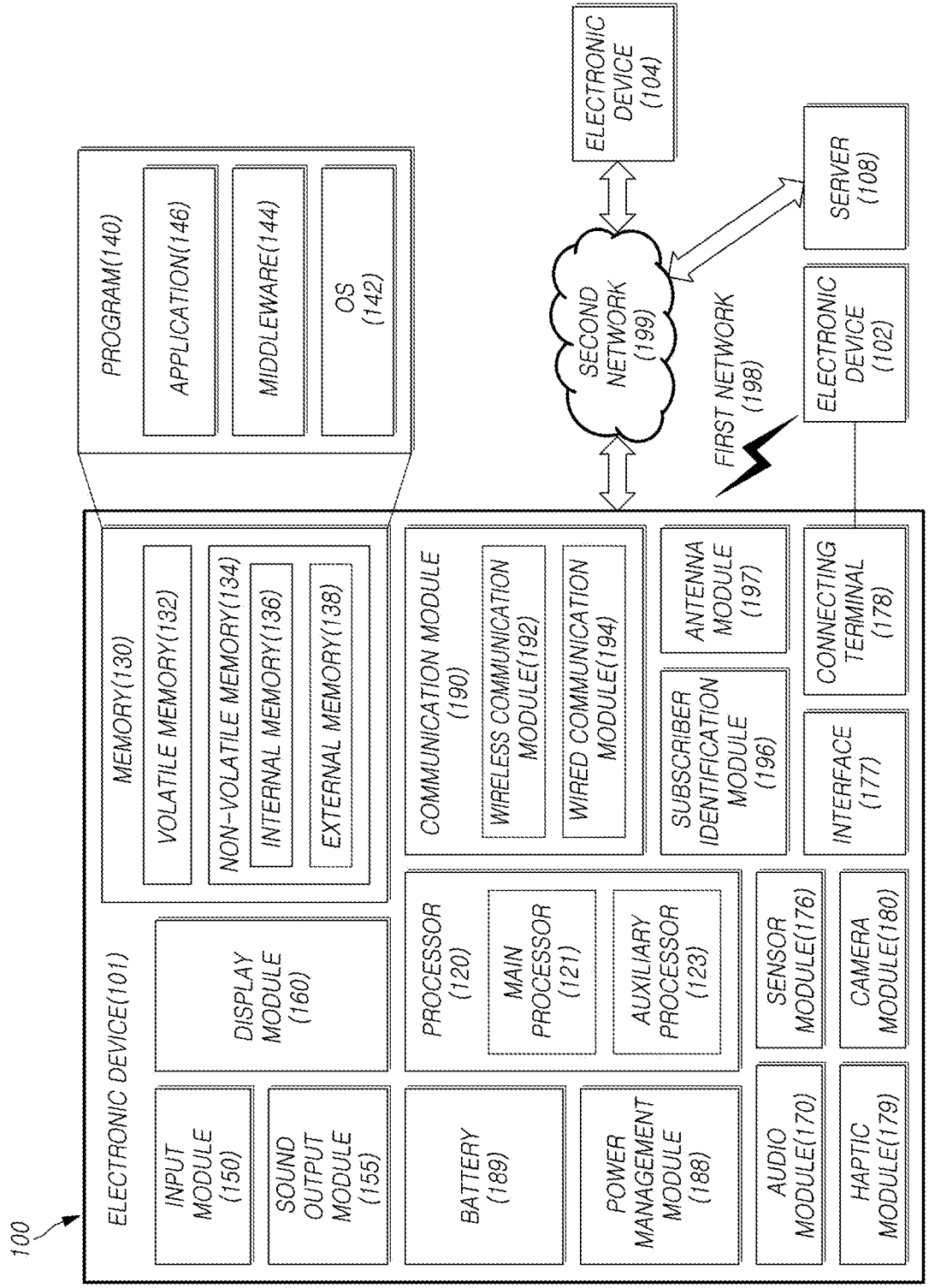
FIG. 1 is a block diagram illustrating an electronic device in a network environment according to various embodiment of the disclosure.

Hereinafter, with reference to the drawings, various embodiments of the disclosure will be described in detail so that those having ordinary knowledge in the technical field to which the disclosure pertains can easily implement the disclosed invention. However, the disclosure may be implemented in several different forms and is not limited to the embodiments described herein. In conjunction with the description of the drawings, like or similar reference numerals may be used for such like or similar components. Further, in the drawings and their related descriptions, descriptions of well-known functions and configurations may be omitted for clarity and conciseness.

FIG. 1 is a block diagram illustrating an electronic device 101 in a network environment 100 according to various embodiments.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197. According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
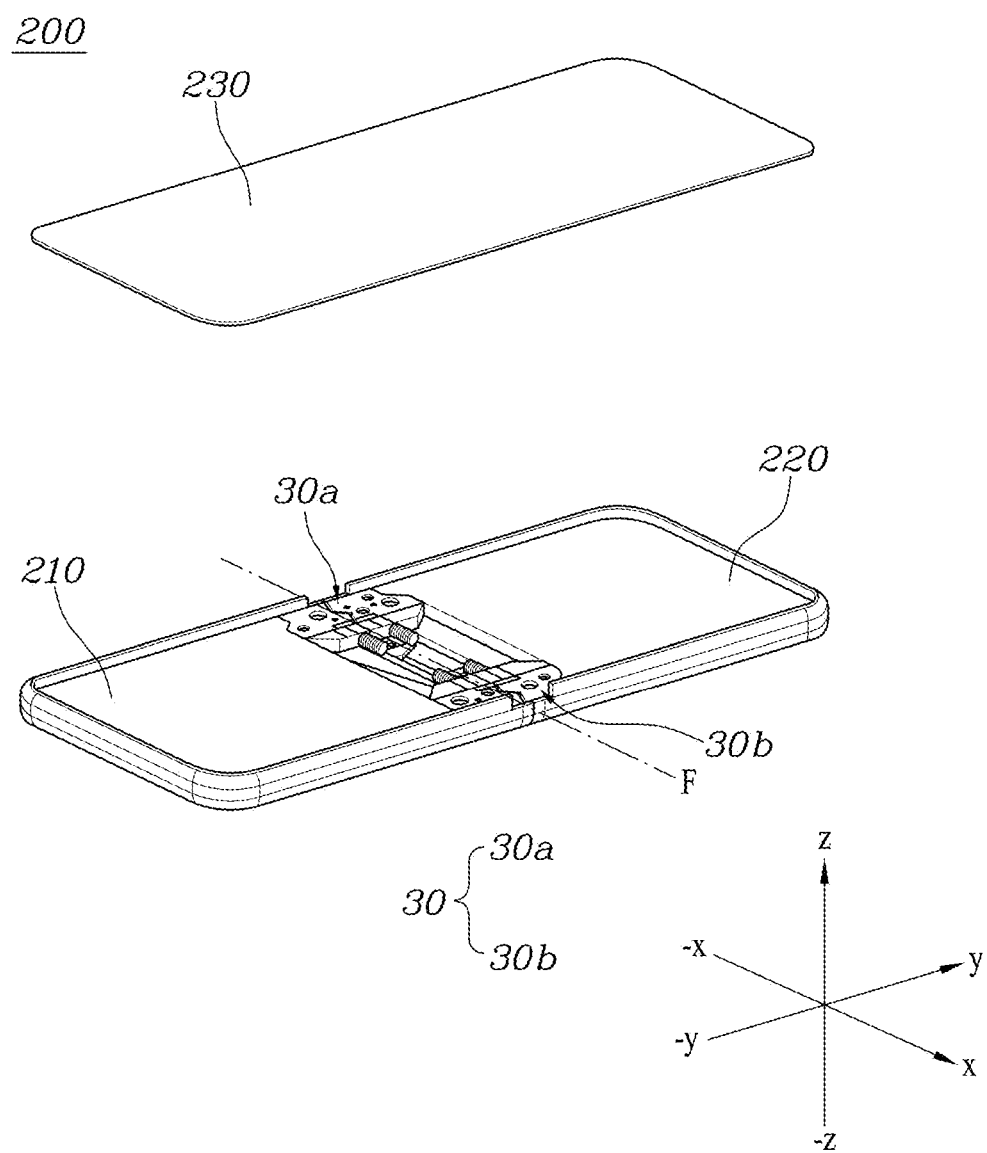
FIG. 2A is a view illustrating an unfolded state of an electronic device according to an embodiment of the disclosure.

FIG. 2A is a view illustrating an unfolded state of an electronic device according to an embodiment of the disclosure.

Figure 2B:
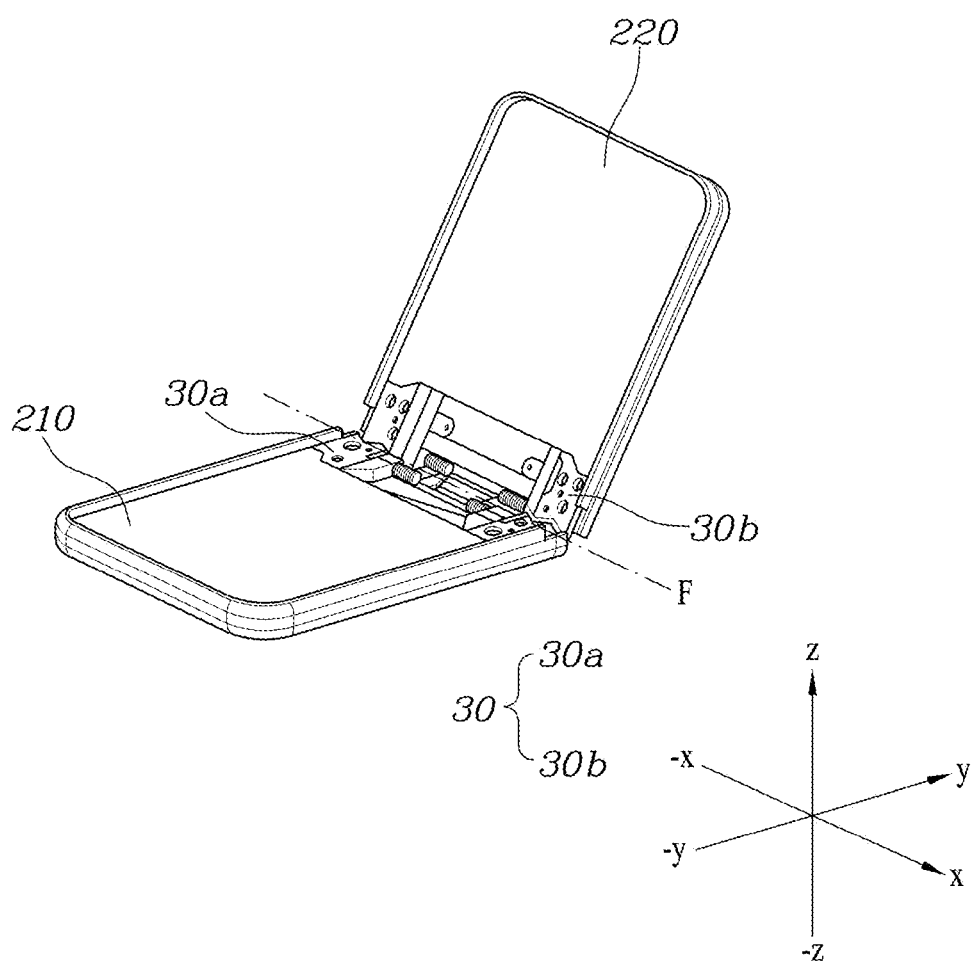
FIG. 2B is a view illustrating a folded state of an electronic device according to an embodiment of the disclosure.

FIG. 2B is a view illustrating a folded state of an electronic device according to an embodiment of the disclosure.

Referring to FIGS. 2A and 2B, in various embodiments, an electronic device 200 (e.g., the electronic device 101 of FIG. 1) may include a first housing 210, a second housing 220, a display 230, a hinge housing (e.g., hinge housing 240 of FIG. 3B or FIG. 3C) or a hinge structure unit 30. The hinge structure unit 30 may include, e.g., a first hinge structure 30a and/or a second hinge structure 30b.

According to an embodiment, the first housing 210 and/or the second housing 220 may be assembled by the hinge structure unit 30, constituting a single assembly that is rotatable to fold or unfold. When the first housing 210 or the second housing 220 is assembled into one assembly structure by the hinge structure unit 30, the first housing 210 and the second housing 220 may be separately disposed on two opposite sides (e.g., +y axis or −y axis) of the hinge structure unit 30 disposed in the X-axis direction. The first housing 210 may be disposed on one side (e.g., −y-axis) of the hinge structure unit 30. The second housing 220 may be disposed, e.g., on the other side (e.g., +y-axis) of the hinge structure unit 30. The first housing 210 or the second housing 220 may be rotatably connected to the hinge structure unit 30. The first housing 210 or the second housing 220 may remain in a fully unfolded state (e.g., refer to FIG. 3A) by the hinge structure unit 30, a partially unfolded state (e.g., refer to FIG. 3B) to have a predetermined angle by the hinge structure unit 30, or a folded state (e.g., refer to FIG. 3C) to face each other by the hinge structure unit 30.

According to an embodiment, the display 230 may extend from the first housing 210 to the second housing 220. The display 230 may be disposed in a space formed by the first housing 210 and the second housing 220. The display 230 may be positioned on an upper surface (e.g., +z-axis) of the first housing 210 and the second housing 220 assembled by the hinge structure unit 30. The display 230 may have flexibility to be bent. In the display 230, a portion, e.g., a portion corresponding to the upper surface of the hinge housing 240, may be bent. The display 230 may be fully unfolded, partially unfolded (or partially folded), or fully folded with the aid of a hinge structure, e.g., the hinge structure unit 30. The display 230 may remain in the fully unfolded state or in the partially unfolded (or partially folded) state to form a predetermined angle.

According to an embodiment, the hinge housing 240 may be connected to the first housing 210 and/or the second housing 220, forming a single assembly. The hinge housing 240 may be disposed between the first housing 210 and the second housing 220. The hinge structure unit 30 may be received in the hinge housing 240. In the unfolded state of the electronic device 200, one side of the first housing 210 and one side of the second housing 220 tightly contact each other so that the hinge housing 240 may not be exposed to the outside (refer to FIG. 3A). In the folded state of the hinge housing 240, one side of the first housing 210 and one side of the second housing 220 move away from each other so that at least a portion of the hinge housing 240 may be exposed to the outside (refer to FIGS. 3B and 3C).

According to an embodiment, the hinge structure unit 30 may connect the first housing 210 and the second housing 220 to allow the first housing 210 and/or the second housing 220 to rotate, forming a single assembly.

According to an embodiment, the hinge structure unit 30 of the electronic device 200 may include a plurality of hinge structures (e.g., hinge structure 30a or 30b). The electronic device 200 may include, e.g., the first hinge structure 30a and/or the second hinge structure 30b. The first hinge structure 30a or the second hinge structure 30b may be disposed to be spaced apart from each other on the hinge housing 240. The first hinge structure 30a may be disposed, e.g., on the rear side (e.g., −x axis) of the second hinge structure 30b. However, the hinge structure unit 30 is not limited to two hinge structures and, if necessary, the hinge structure unit 30 may include three or more hinge structures disposed in the hinge housing 240.

According to an embodiment, the electronic device 200 may be folded in at least one manner among in-folding, out-folding, and in/out-folding. In-folding may refer to a way to fold the display 230 inward, and out-folding may refer to a way to fold the display 230 outward to allow the first housing 210 and the second housing 220 to face each other. In/out-folding may refer to a way to fold a portion of the display 230 inward and fold the rest outward. An in-folding electronic device in which the display 230 is folded inward is described below as an example.

Figure 3A:
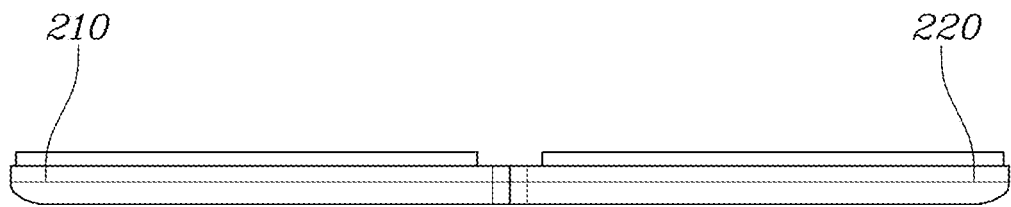
FIG. 3A is a view illustrating a fully unfolded state of an electronic device according to an embodiment of the disclosure.

FIG. 3A is a view illustrating a fully unfolded state of an electronic device according to an embodiment of the disclosure.

Figure 3B:
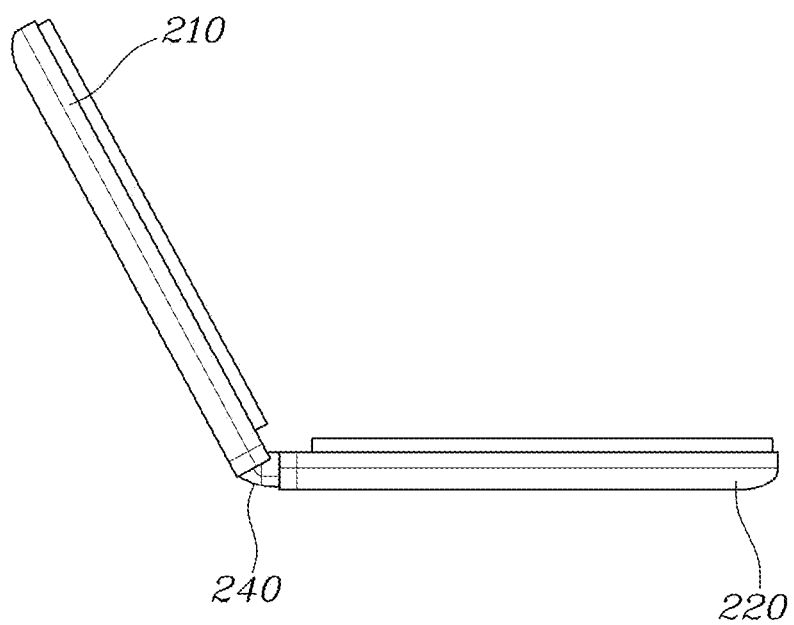
FIG. 3B is a view illustrating a partially folded (or partially unfolded) state of an electronic device according to an embodiment of the disclosure.

FIG. 3B is a view illustrating a partially folded (or partially unfolded) state of an electronic device according to an embodiment of the disclosure.

Figure 3C:
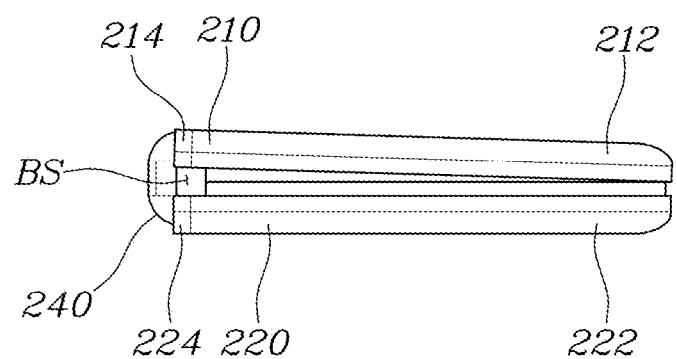
FIG. 3C is a view illustrating a fully folded state of an electronic device according to an embodiment of the disclosure.

FIG. 3C is a view illustrating a fully folded state of an electronic device according to an embodiment of the disclosure.

Referring to FIGS. 3A, 3B, and 3C, according to various embodiments, the first housing 210 and/or the second housing 220 may be rotated about the rotational axis in opposite directions. For example, in a folding operation which starts from the unfolded state, the first housing 210 may be rotated counterclockwise (or clockwise), and the second housing 220 may be rotated clockwise (or counterclockwise). Alternatively, the first housing 210 may be fixed while the second housing 220 is rotated clockwise (or counterclockwise), or the second housing 220 may be fixed while the first housing 210 is rotated counterclockwise (or clockwise).

For example, in an unfolding operation which starts from the folded state, the first housing 210 may be rotated clockwise (or counterclockwise), and the second housing 220 may be rotated counterclockwise (or clockwise). Alternatively, the first housing 210 may be fixed while the second housing 220 is rotated clockwise (or counterclockwise), or the second housing 220 may be fixed while the first housing 210 is rotated counterclockwise (or clockwise).

Referring to FIG. 3A, in the fully unfolded state (also referred to as a fully flat state) of the electronic device 200, the first housing 210 and the second housing 220 may be disposed substantially parallel to each other on a plane. In this case, the hinge housing 240 may be fully hidden from the outside by the first housing 210 and/or the second housing 220.

Referring to FIG. 3B, in a partially unfolded state (or partially folded state) of the electronic device 200, the first housing 210 and the second housing 220 may form a predetermined angle (e.g., an obtuse angle) therebetween. In this case, the hinge housing 240 may be partially exposed to the outside by the first housing 210 and/or the second housing 220, with the rest hidden from the outside.

Referring to FIG. 3C, in the fully folded state of the electronic device 200, the first housing 210 and the second housing 220 may be disposed to be stacked on each other so that their respective inner surfaces face each other. In the fully folded state, one end 212 of the first housing 210 may contact one end 222 of the second housing 220. In the fully folded state, the other end 214 of the first housing 210 may be spaced apart from the other end 224 of the second housing 220 by the hinge housing 240. In the fully folded state, a bending space BS may be formed between the first housing 210 and the second housing 220. When the electronic device 200 is fully folded, the stress exerted on the display 230 may be reduced by the bending space BS.

Referring to FIGS. 3A, 3B, and 3C, the hinge housing 240 of the electronic device 200 may be exposed to the outside in its maximum area in the fully folded state and, while changing from the fully folded state to the fully unfolded state, the area exposed to the outside may gradually reduce.

Figure 4:
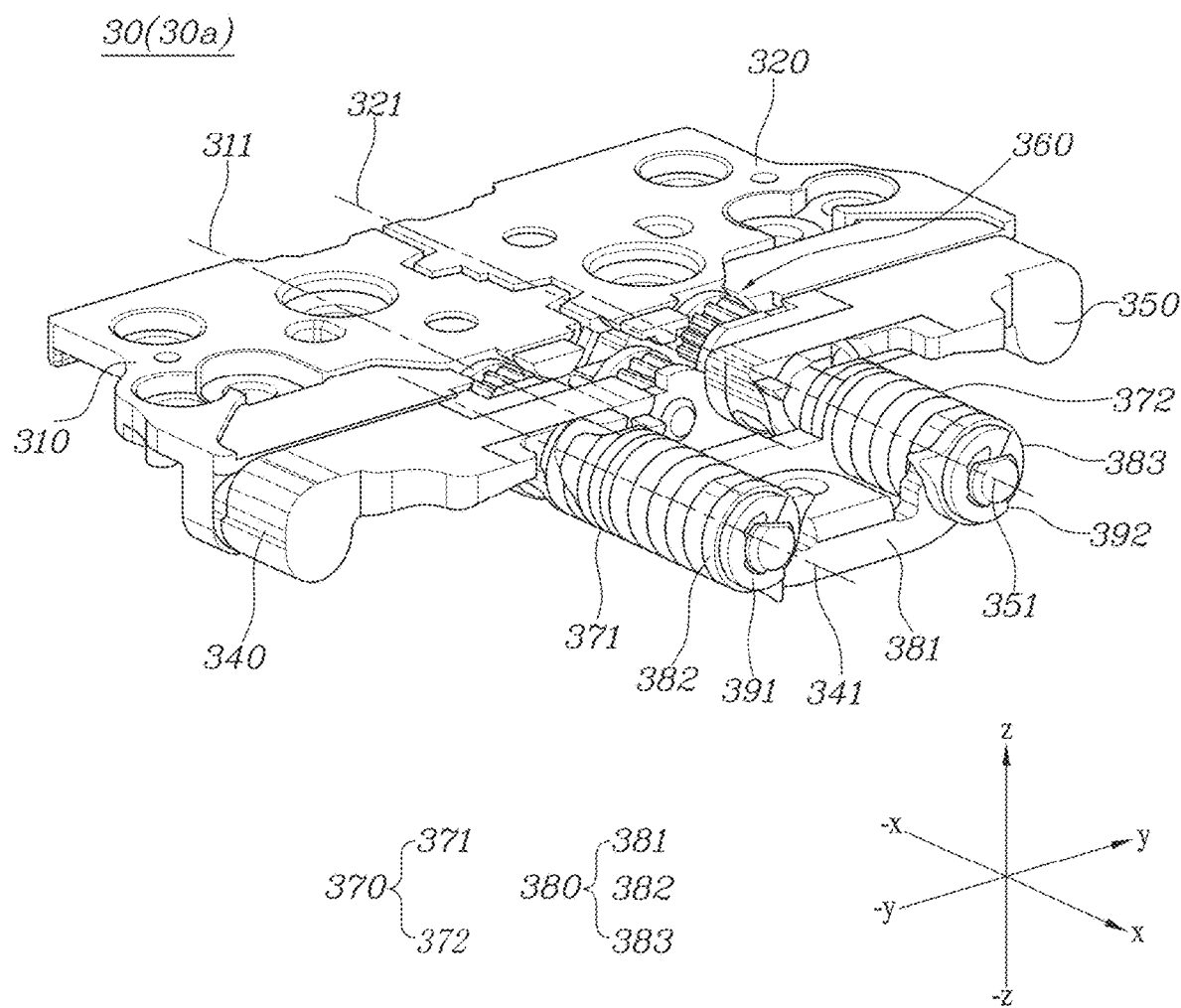
FIG. 4 is a perspective view illustrating a hinge structure according to an embodiment of the disclosure.

FIG. 4 is a perspective view illustrating a hinge structure according to an embodiment of the disclosure.

Referring to FIG. 4, a hinge structure unit 30 (e.g., the first hinge structure 30a or the second hinge structure 30b of FIG. 2A or FIG. 2B) may be either the first hinge structure 30a or the second hinge structure 30b described above. Hereinafter, for convenience of description, the description focuses primarily on the first hinge structure 30a.

According to various embodiments, the hinge structure unit 30 may include a first rotator 310, a second rotator 320, a fixing bracket (e.g., fixing bracket 330 of FIGS. 7A, 7B, 7C, 7D, 7E, and 7F), a first cam 340, a second cam 350, a gear unit 360, an elastic portion 370, and/or a support portion 380. The elastic portion 370 may include a first elastic member 371 and/or a second elastic member 372. The support portion 380 may include a support body portion 381, a first support portion 382, or a second support portion 383. The first rotation portion 31 may be a structure into which the first rotator 310 and the first cam 340 are assembled. The second rotation portion 32 may be a structure into which the second rotator 320 and the second cam 350 are assembled.

According to an embodiment, the first rotator 310 may be disposed on an upper surface (e.g., z-axis) of the first housing. The first rotator 310 may extend in a left/right direction (e.g., ±y-axis). The first rotator 310 may be connected to the first housing (e.g., the first housing 210 of FIG. 2A or FIG. 2B) through a fixing member (not shown). The first rotator 310 may be coupled to the fixing bracket 330 to be rotatable about a first rotational axis 311. For example, when the electronic device (e.g., the electronic device 200 of FIG. 2A) is folded or unfolded, the first rotator 310, together with the first housing 210, may be rotated about the first rotational axis 311.

According to an embodiment, the second rotator 320 may be disposed on an upper surface (e.g., z-axis) of the second housing. The second rotator 320 may extend in a left/right direction (e.g., ±y-axis). The second rotator 320 may be connected to the second housing (e.g., the second housing 220 of FIG. 2A or FIG. 2B). The second rotator 320 may be coupled to the fixing bracket 330 to be rotatable about a second rotational axis 321. For example, when the electronic device 200 is folded or unfolded, the second rotator 320, together with the second housing 220, may be rotated about the second rotational axis 321.

According to an embodiment, the second rotational axis 321 and the first rotational axis 311 may be spaced apart from each other and may be substantially parallel to each other. For example, when the electronic device 200 is folded or unfolded, the second rotator 320, together with the second housing 220, may be rotated about the second rotational axis 321. The first rotator 310 and the second rotator 320 may have a symmetrical structure with respect to a folding axis F (e.g., the folding axis F of FIG. 2A) of the electronic device 200.

According to an embodiment, the fixing bracket 330 may be disposed inside the hinge housing (e.g., the hinge housing 240 of FIG. 2A or FIG. 2B). The first rotator 310 and/or the second rotator 320 may be rotatably connected to the fixing bracket 330.

According to an embodiment, the first cam 340 may be disposed in front (e.g., +x axis) of the first rotator 310. The first cam 340 may include a first camshaft 341. The first camshaft 341 may pass through one end (e.g., the x axis) of the first cam 340 and may be rotatably connected to the first cam 340. The first camshaft 341 may pass through the first support portion 382 and be fixed to the support portion 380 through a first fixing pin 391. The first cam 340 may be interlocked with the first rotator 310. For example, the first cam 340 may be rotated when the first rotator 310 rotates.

According to an embodiment, the second cam 350 may be disposed in front (e.g., x axis) of the second rotator 320. The second cam 350 may include a second camshaft 351. The second camshaft 351 may pass through one end (e.g., the x axis) of the second cam 350 and may be rotatably connected to the second cam 350. The second camshaft 351 may pass through the second support portion 383 and be fixed to the support portion 380 through a second fixing pin 392. The second camshaft 351 may be spaced apart from and parallel to the first camshaft 341. The second cam 350 may be interlocked with the second rotator 320. For example, the second cam 350 may be rotated when the second rotator 320 rotates. The first cam 340 and the second cam 350 may be symmetrical with respect to the folding axis F of the electronic device 200.

According to an embodiment, the gear unit 360 may be disposed between the first and second rotators 310 and 320 and the first and second cams 340 and 350. The gear unit 360 may include a plurality of gears that interlock the first cam 340 and the second cam 350. The gear unit 360 may include, e.g., a plurality of shaft gears and a plurality of idle gears connected to the first and second camshafts 341 and 351. The gear unit 360 may transfer force to the second housing 220 so that when the first housing 210 is rotated, the second housing 220 may be rotated together. The gear unit 360 may transfer force to the first housing 210 so that when the second housing 220 is rotated, the first housing 210 may be rotated together.

According to an embodiment, the elastic portion 370 may provide an elastic force to the hinge structure unit 30 to keep the electronic device 200 in the unfolded state or the folded state.

The elastic portion 370 may include, e.g., at least one elastic member. The elastic portion 370 may include, e.g., the first elastic member 371 that is disposed before (e.g., x axis) the first cam 340 to have the first camshaft 341 inserted therein and the second elastic member 372 that is disposed before (e.g., x axis) the second cam 350 to have the second camshaft 351 inserted therein.

According to an embodiment, the support portion 380 may be positioned before (e.g., x axis) of the cams 340 and 350. The support portion 380 may support the elastic portion 370. The support portion 380 may support the elastic members 371 and 372 to prevent the elastic members 371 and 372 from escaping off in the x-axis direction, for example. The support portion 380 may include the first support portion 382 that is formed on one side (e.g., −y axis) of the support body portion 381 to have the first camshaft 341 inserted therein and the second support portion 383 that is formed on the other side (e.g., y axis) to have the second camshaft 351 inserted therein. One surface (e.g., −x axis) of the first support portion 382 may contact one end of the first elastic member 371, supporting the first elastic member 371. One surface (e.g., −x axis) of the second support portion 383 may contact one end of the second elastic member 372, supporting the second elastic member 372.

Figure 5:
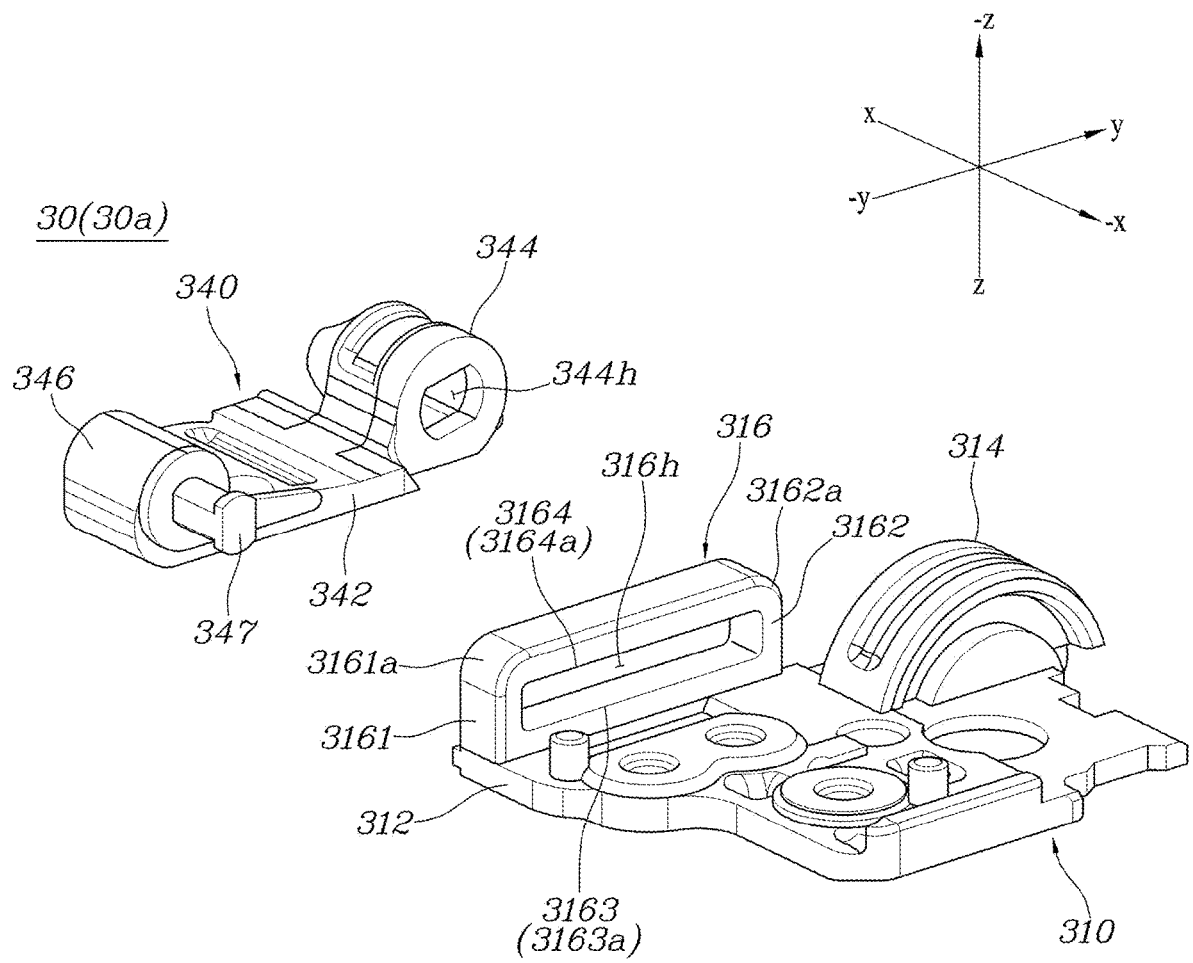
FIG. 5 is an exploded perspective view illustrating a rotator (e.g., first rotator of FIG. 4) and a cam (e.g., first cam of FIG. 4) included in a hinge structure (e.g., hinge structure unit of FIG. 4) according to an embodiment of the disclosure.
Figure 6A:
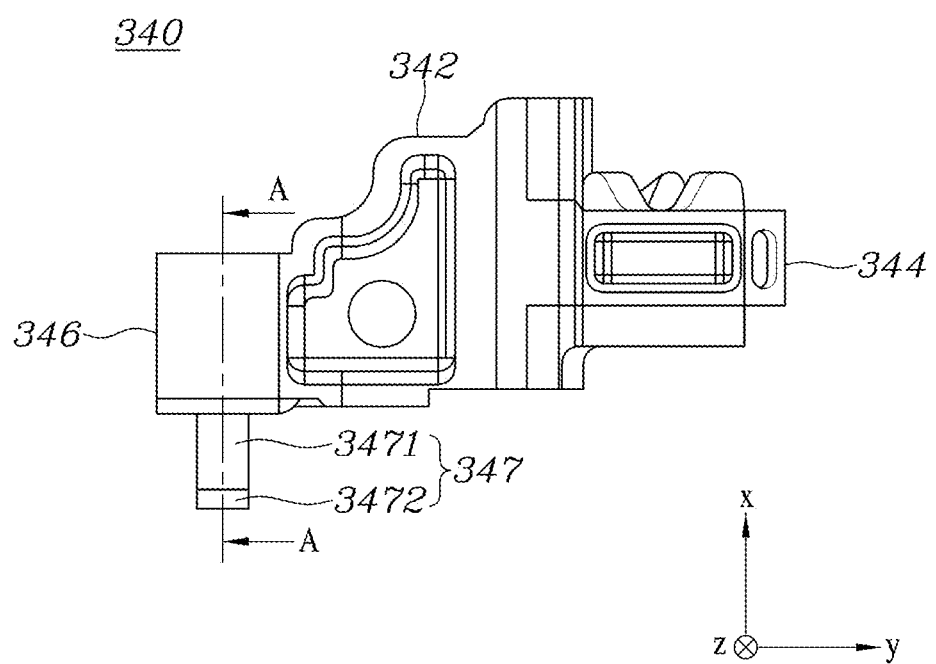
FIG. 6A is a plan view illustrating the cam of FIG. 5 according to an embodiment of the disclosure.

FIG. 5 is an exploded perspective view illustrating a rotator (e.g., a first rotator 310 of FIG. 4) and a cam (e.g., a first cam 340 of FIG. 4) included in a hinge structure (e.g., a hinge structure unit 30 of FIG. 4) according to an embodiment of the disclosure. FIG. 6A is a plan view illustrating a cam 340 of FIG. 5 according to an embodiment of the disclosure.

Figure 6B:
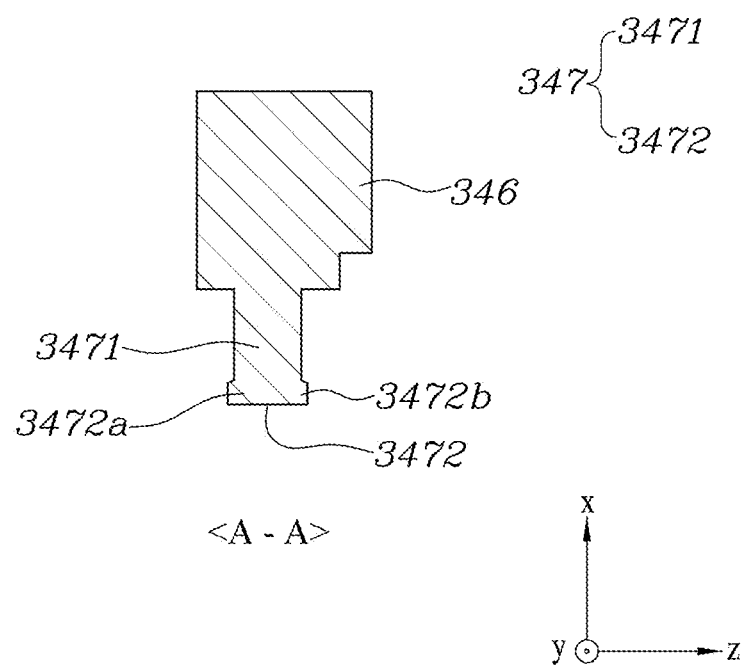
FIG. 6B is a cross-sectional view taken along line A-A of FIG. 6A according to an embodiment of the disclosure.

FIG. 6B is a cross-sectional view taken along line A-A of FIG. 6A according to an embodiment of the disclosure.

The following description of the first rotator 310 and the first cam 340 may be applied to the second rotator 320 and the second cam 350 in substantially the same manner. The first rotator 310 and the second rotator 320 may have substantially the same or similar shape or structure except for being symmetrical with respect to the folding axis F. The first cam 340 and the second cam 350 may have substantially the same or similar shape or structure except for being symmetrical with respect to the folding axis F.

Referring to FIGS. 5, 6A, and 6B, in various embodiments, the first rotator 310 may include a first rotator body 312, a first guide portion 314, or a first interlocking guide 316.

According to an embodiment, the first rotator body 312 may be coupled with the first housing 210. The first rotator body 312 may have at least one fastening hole (not shown) where a fastening member (not shown) for coupling with the first housing 210 is inserted. The first rotator body 312 may extend in a left/right direction (e.g., ±y-axis). The first rotator body 312 may be formed in, e.g., a plate shape.

According to an embodiment, the first guide portion 314 may be formed at one end (e.g., y axis) of the first rotator body 312. The first guide portion 314 may be formed to protrude from the first rotator body 312. The first guide portion 314 may be formed, e.g., in a semicircular shape. The first guide portion 314 may be rotatably connected to the fixing bracket 330 and may support the rotation of the first rotator 310. The first guide portion 314 may be inserted into, e.g., a guide groove (not shown) formed in one surface of the fixing bracket 330 (refer to FIG. 7C).

According to an embodiment, the first interlocking guide 316 may be formed at one end (e.g., x axis) of the first rotator body 312. The first interlocking guide 316 may be formed to protrude from the first rotator body 312. The first interlocking guide 316 has a first interlocking hole 316h into which a first interlocking protrusion 347 of the first cam 340 is inserted when the first rotator 310 and the first cam 340 are interlocked. The first interlocking guide 316 may be integrally formed with the first rotator body 312, or may be formed as a separate component.

The first interlocking guide 316 may include a first vertical portion 3161, a second vertical portion 3162, a first horizontal portion 3163, and a second horizontal portion 3164.

According to an embodiment, the first vertical portion 3161 may extend upward (e.g., −z axis) from the first rotator body 312. According to an embodiment, the first vertical portion 3161 may include a first connection portion 3161a that is bent from one end of the first vertical portion 3161 toward the second horizontal portion 3164 and is connected to the second horizontal portion 3164.

According to an embodiment, the second vertical portion 3162 may extend upward (e.g., −z-axis) from the first rotator body 312. According to an embodiment, the second vertical portion 3162 may include a second connection portion 3162a that is bent from one end of the second vertical portion 3162 toward the second horizontal portion 3164 and is connected to the second horizontal portion 3164. The first vertical portion 3161 and the second vertical portion 3162 may be spaced apart from each other in the left/right direction (e.g., ±y-axis) with the first interlocking hole 316h interposed therebetween.

According to an embodiment, the first horizontal portion 3163 may be positioned on one surface (e.g., an upper surface) of the first rotator body 312. The first horizontal portion 3163 may connect the first vertical portion 3161 and the second vertical portion 3162.

According to an embodiment, the second horizontal portion 3164 may be positioned over (e.g., −z axis) of the first horizontal portion 3163. The first horizontal portion 3163 and the second horizontal portion 3164 may be spaced apart from each other in the upper/lower direction (e.g., ±z-axis) with the first interlocking hole 316h interposed therebetween. The second horizontal portion 3164 may connect the first vertical portion 3161 and the second vertical portion 3162. One end (e.g., −y axis) of the second horizontal portion 3164 may be connected to, e.g., the first connection portion 3161a of the first vertical portion 3161. The other end (e.g., y axis) of the second horizontal portion 3164 may be connected to, e.g., the second connection portion 3162a of the second vertical portion 3162.

According to an embodiment, the first interlocking hole 316h may extend in the left/right direction (e.g., ±y-axis). The first interlocking hole 316h may be defined by an inner surface of the first interlocking guide 316. The first interlocking hole 316h may mean, e.g., a space surrounded by the first vertical portion 3161, the second vertical portion 3162, the first horizontal portion 3163, and the second horizontal portion 3164. The first interlocking hole 316h may form a sliding section where the first interlocking protrusion 347 of the first cam 340 moves when the first rotator 310 and the first cam 340 are interlocked.

According to various embodiments, the first cam 340 may include a first cam body 342, a first part 344, and a second part 346.

According to an embodiment, the first cam body 342 may connect the first part 344 and the second part 346.

According to an embodiment, the first part 344 may be formed at one end (e.g., y axis) of the first cam body 342. A hole 344h into which the first camshaft 341 is inserted may be formed in the first part 344.

According to an embodiment, the second part 346 may be formed at the other end (e.g., −y axis) of the first cam body 342. The second part 346 may support interlocking of the first rotator 310 and the first cam 340. The second part 346 may contact one side surface of the first interlocking guide 316 to support interlocking between the first rotator 310 and the first cam 340 when insertion of the first interlocking protrusion 347 into the first interlocking hole 316h is completed.

According to an embodiment, the second part 346 may have the first interlocking protrusion 347 for interconnecting the first rotator 310 and the first cam 340. The first interlocking protrusion 347 may protrude from the second part 346 in a direction (e.g., −x axis) toward the first interlocking hole 316h.

According to an embodiment, the first interlocking protrusion 347 may allow the first rotator 310 and the first cam 340 to interlock with each other, maintaining the interlocking between the first rotator 310 and the first cam 340. For example, the first interlocking protrusion 347 may be inserted into the first interlocking hole 316h, preventing the first cam 340 from escaping off the first interlocking guide 316. The first interlocking protrusion 347 may slide in the left/right direction (e.g., ±y-axis) along the first interlocking hole 316h in the first interlocking guide 316.

The first interlocking protrusion 347 may include a first protrusion shaft 3471 and a first anti-escape portion 3472.

According to an embodiment, the first protrusion shaft 3471 may protrude from the second part 346 of the first cam 340 and may extend in a direction (e.g., a first direction, −x axis) toward the first interlocking hole 316h. The length of the first protrusion shaft 3471 may be the same as the thickness of the first interlocking guide 316.

According to an embodiment, the first anti-escape portion 3472 may be formed at an end of the first protrusion shaft 3471. The first anti-escape portion 3472 may extend in the upper/lower direction (e.g., ±z-axis) from an end of the first protrusion shaft 3471. The vertical width (e.g., ±z-axis) of the first anti-escape portion 3472 may be larger than the horizontal width (e.g., ±y-axis) of the first anti-escape portion 3472.

The first anti-escape portion 3472 may include a first end 3472a extending upward (e.g., a second direction, −z axis) from an end of the first protrusion shaft 3471 and a second end 3472b extending downward (e.g., a third direction, z axis) from an end of the first protrusion shaft 3471.

According to an embodiment, the first end 3472a may form a step from the upper surface (e.g., −z axis) of the first protrusion shaft 3471, preventing the first interlocking protrusion 347 from escaping off. After the first interlocking protrusion 347 is inserted into the first interlocking hole 316h, the first end 3472a may contact a side surface 3164a of the second horizontal portion 3164, preventing the first interlocking protrusion 347 from escaping off the first interlocking guide 316.

According to an embodiment, the second end 3472b may form a step from the lower surface (e.g., +z axis) of the first protrusion shaft 3471, preventing the first interlocking protrusion 347 from escaping off. After the first interlocking protrusion 347 is inserted into the first interlocking hole 316h, the second end 3472b may contact a side surface 3163a of the first horizontal portion 3163, preventing the first interlocking protrusion 347 from escaping off the first interlocking guide 316.

FIGS. 7A, 7B, 7C, 7D, 7E, and 7F are views illustrating a method for assembling a hinge structure according to various embodiments of the disclosure.

Figure 7A:
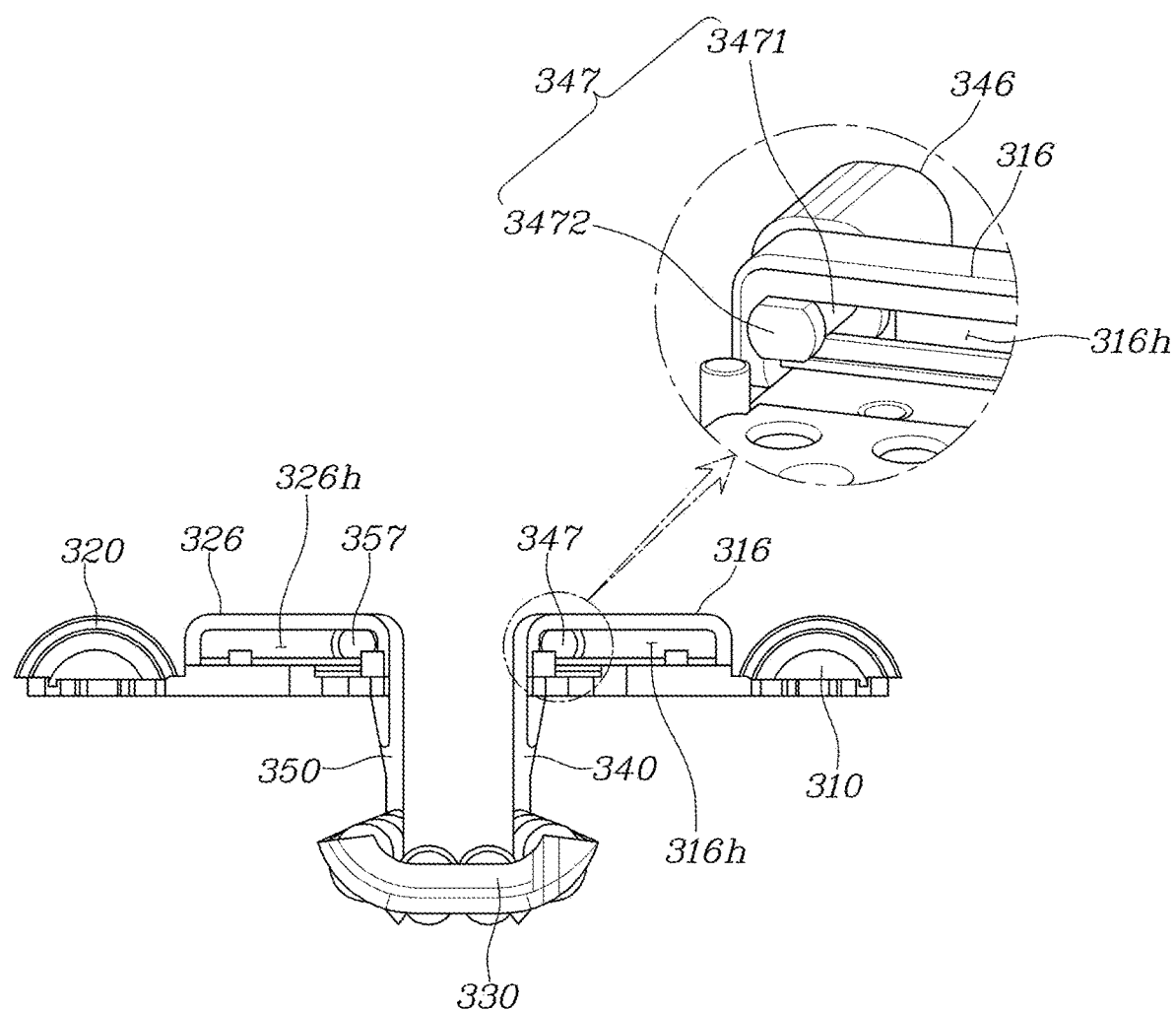
FIGS. 7A, 7B, 7C, 7D, 7E, and 7F are views illustrating a method for assembling a hinge structure according to various embodiments of the disclosure.

Referring to FIG. 7A, in an embodiment, the first cam 340 and the second cam 350 may be rotatably coupled to the fixing bracket 330 through their respective camshafts 341 and 351. The first cam 340 and the second cam 350 may be disposed perpendicular to the fixing bracket 330. The first rotator 310 may be disposed perpendicular to the first cam 340, and the first interlocking protrusion 347 of the first rotator 310 may be inserted into the first interlocking hole 316h formed in the first interlocking guide 316 of the first cam 340. The second rotator 320 may be disposed perpendicular to the second cam 350, and a second interlocking protrusion 357 of the second rotator 320 may be inserted into a second interlocking hole 326h formed in a second interlocking guide 326 of the second cam 350.

Specifically, with respect to the first rotator 310 and the first cam 340, the first interlocking protrusion 347 may be inserted into the first interlocking hole 316h so that the first anti-escape portion 3472 of the first interlocking protrusion 347 is positioned outside the first interlocking hole 316h. The same description may also be applied to the second rotator 320 and the second cam 350.

Figure 7B:
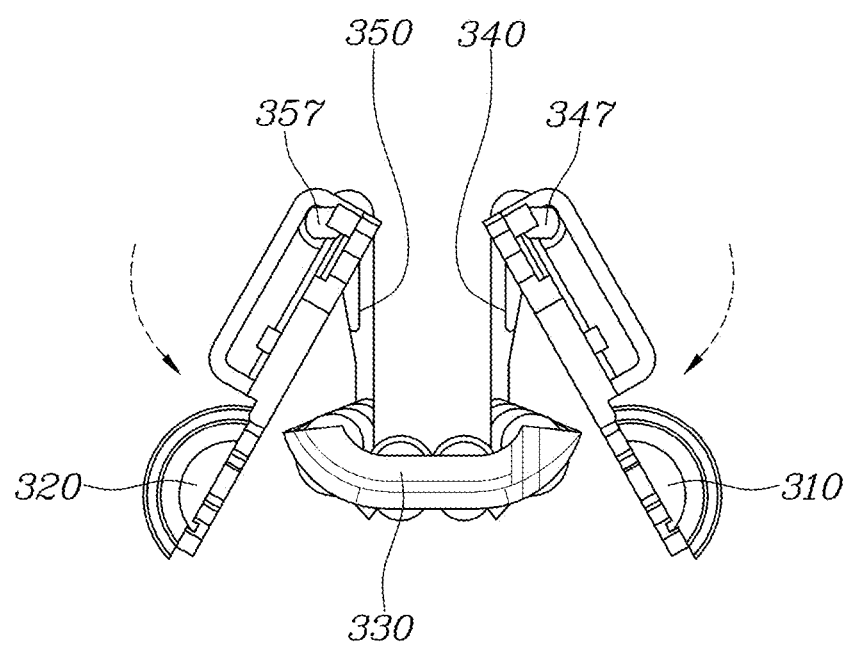

Referring to FIG. 7B, in an embodiment, the first rotator 310 may rotate clockwise, and the second rotator 320 may rotate counterclockwise. The first rotator 310 and the second rotator 320 may rotate around their respective interlocking protrusions (e.g., 347 and 357).

Figure 7C:
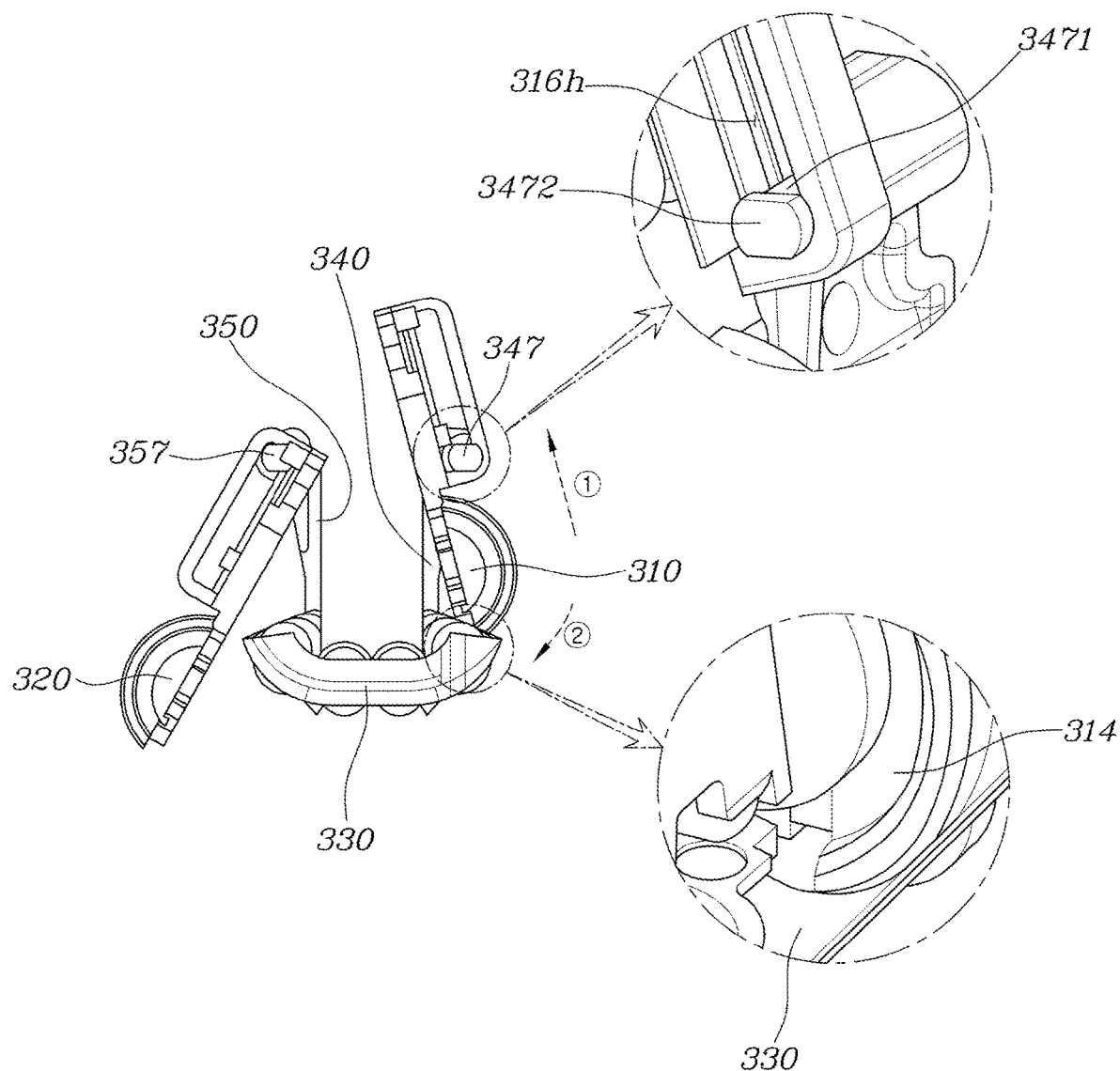
Figure 7D:
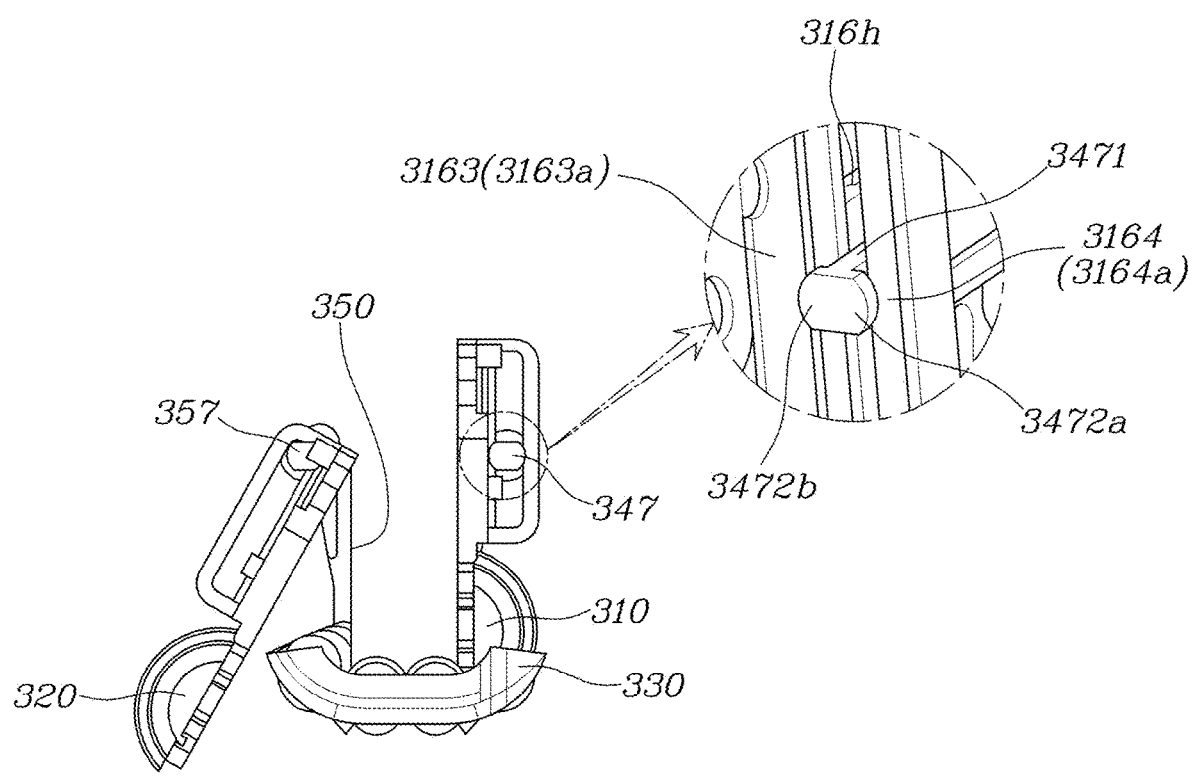

Referring to FIGS. 7C and 7D, in an embodiment, the first rotator 310 may be moved in direction ① (e.g., an oblique direction) so that the first interlocking protrusion 347 is slid along the first interlocking hole 316h. Thereafter, the first rotator 310 may be rotated in direction ② (e.g., clockwise) so that the first guide portion 314 is inserted into the guide groove (not shown) formed in the fixing bracket 330. The first interlocking protrusion 347 of the first cam 340 may be prevented from escaping off the first rotator 310 as the first end 3472a and the second end 3472b contact one side surface (e.g., 3163a or 3164a) of the first interlocking guide 316. The first rotator 310 may be rotatably connected to the fixing bracket 330. As a result, the first rotator 310 and the first cam 340 may be interlocked and be rotated at the same angle during the hinge operation.

Figure 7E:
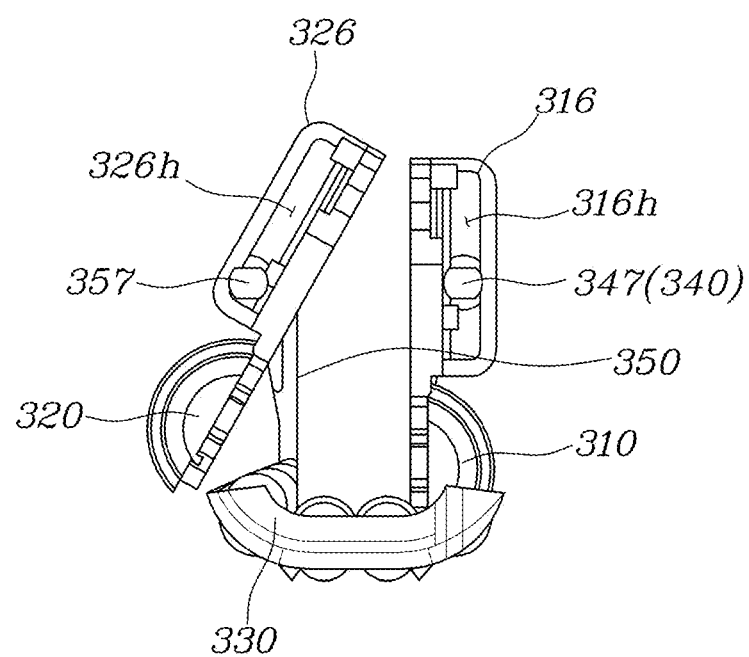
Figure 7F:
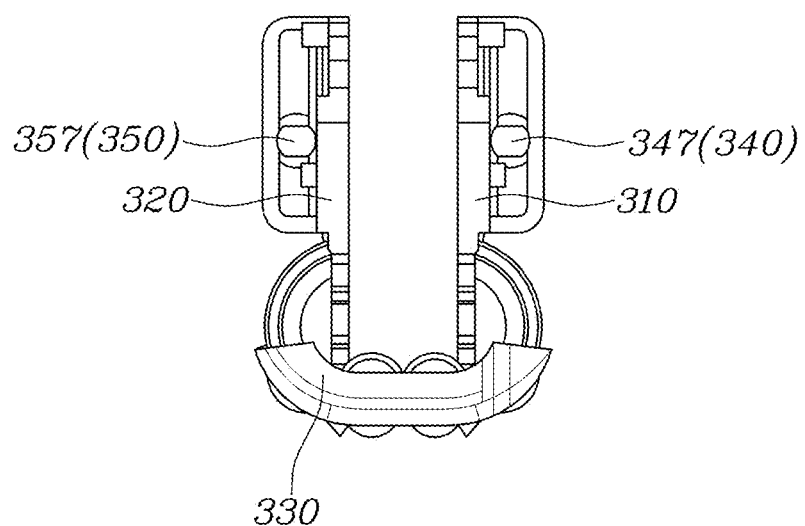

Referring to FIGS. 7E and 7F, in an embodiment, the method for assembling the first rotator 310 shown in FIGS. 7C and 7D may be performed on the second rotator 320 in substantially the same manner. As a result, when the assembly of the hinge structure unit 30 may be completed, the first rotator 310 and the first cam 340 may be interlocked without being separated, and so may the second rotator 320 and the second cam 350. The first rotator 310 and the first cam 340 may be interlocked to rotate at the same angle during the hinge operation. The second rotator 320 and the second cam 350 may be interlocked to rotate at the same angle during the hinge operation.

Figure 8:
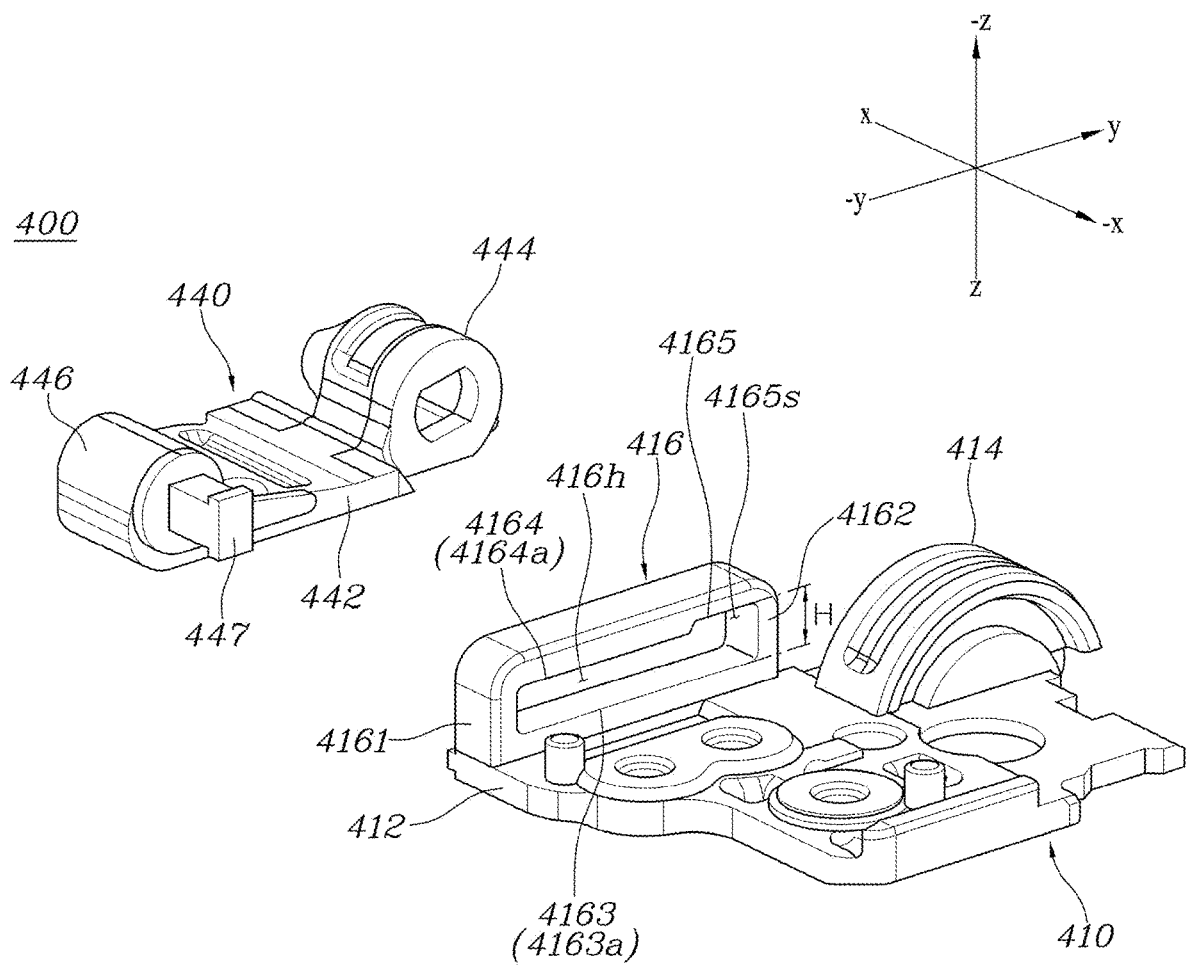
FIG. 8 is an exploded perspective view illustrating a rotator (e.g., first rotator of FIG. 4) and a cam (e.g., first cam of FIG. 4) included in a hinge structure (e.g., hinge structure unit of FIG. 4) according to an embodiment of the disclosure.

FIG. 8 is an exploded perspective view illustrating a rotator (e.g., a first rotator 310 of FIG. 4) and a cam (e.g., a first cam 340 of FIG. 4) included in a hinge structure (e.g., a hinge structure unit 30 of FIG. 4) according to an embodiment of the disclosure.

Figure 9A:
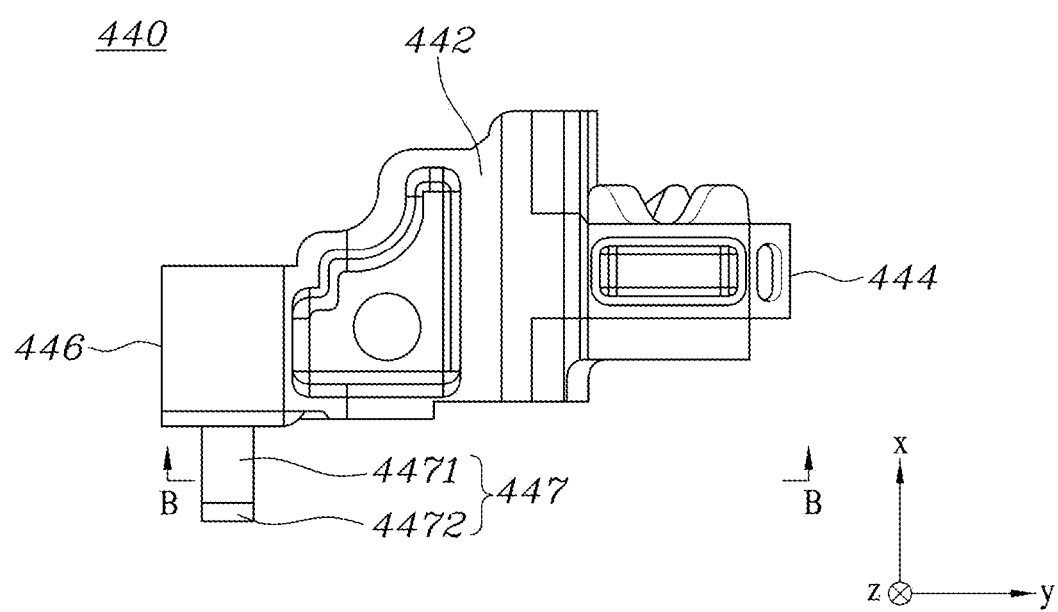
FIG. 9A is a plan view illustrating a first cam of FIG. 8 according to an embodiment of the disclosure.

FIG. 9A is a plan view illustrating a first cam 440 of FIG. 8 according to an embodiment of the disclosure.

Figure 9B:
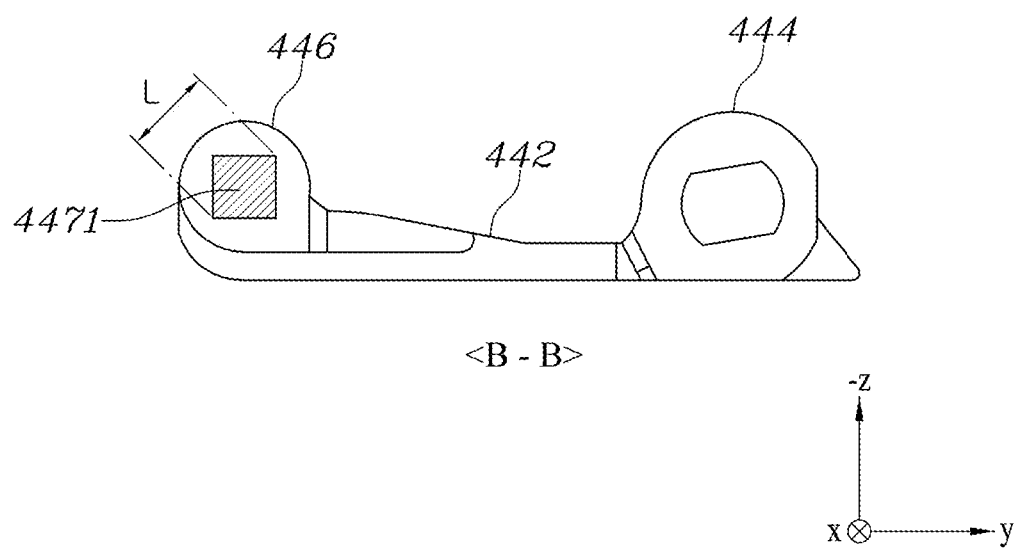
FIG. 9B is a cross-sectional view taken along line B-B of FIG. 9A according to an embodiment of the disclosure.

FIG. 9B is a cross-sectional view taken along line B-B of FIG. 9A according to an embodiment of the disclosure.

Figure 10A:
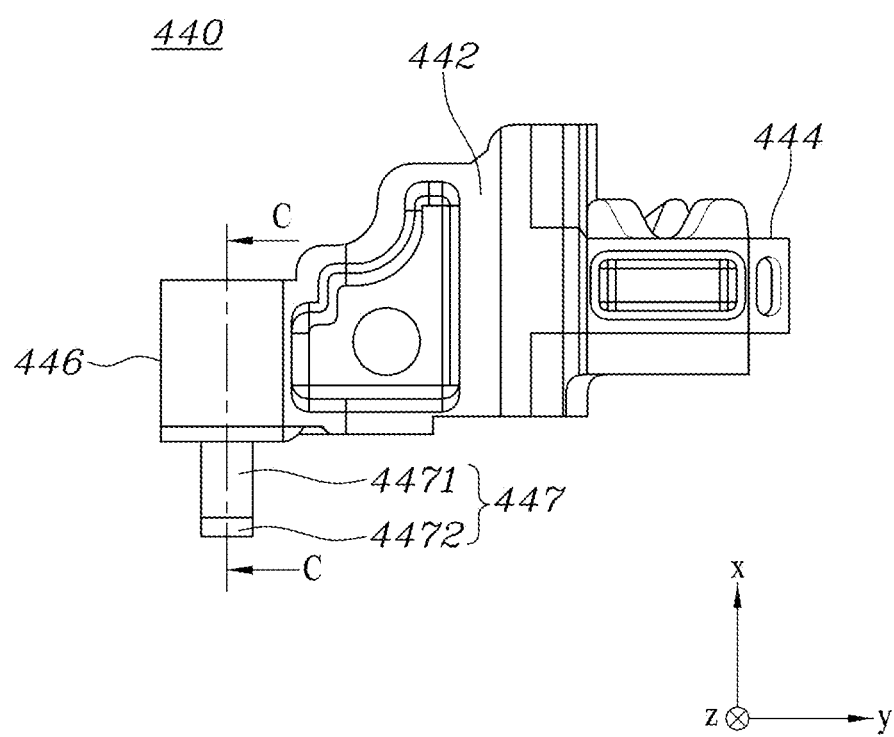
FIG. 10A is a plan view illustrating a first cam of FIG. 8 according to an embodiment of the disclosure.

FIG. 10A is a plan view illustrating a first cam of FIG. 8 according to an embodiment of the disclosure.

Figure 10B:
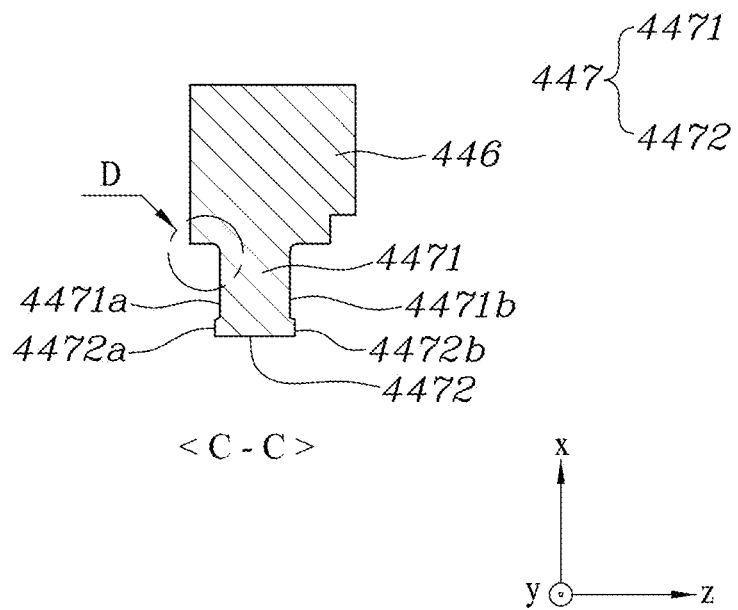
FIG. 10B is a cross-sectional view taken along line C-C of FIG. 10A according to an embodiment of the disclosure.

FIG. 10B is a cross-sectional view taken along line C-C of FIG. 10A according to an embodiment of the disclosure.

Figure 11:
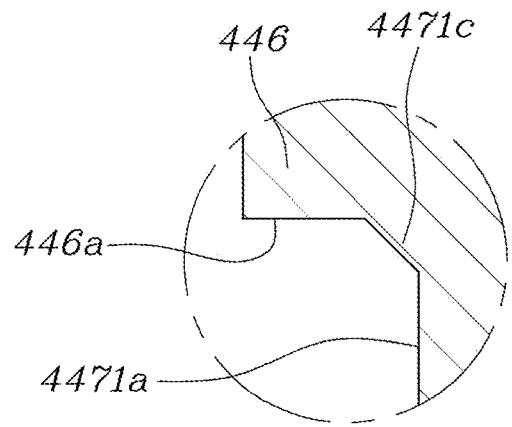
FIG. 11 is an enlarged view illustrating part D of FIG. 10B according to an embodiment of the disclosure.
Figure 11:
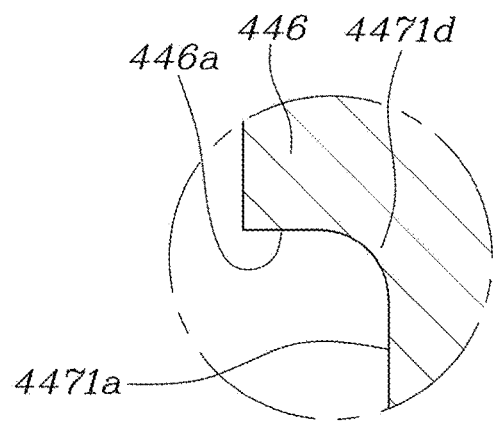
Figure 11:
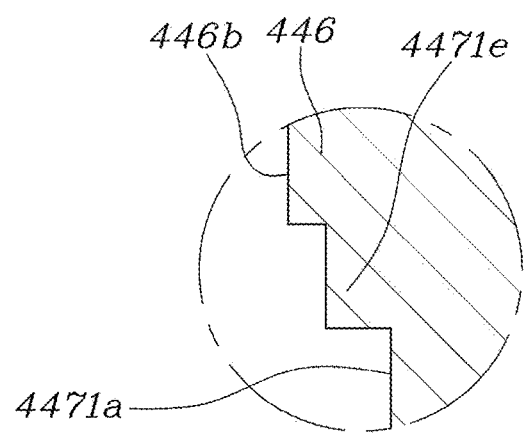

FIG. 11 is an enlarged view illustrating part D of FIG. 10B according to an embodiment of the disclosure.

In describing the instant embodiment, the foregoing description may be applied to components which are substantially identical or similar to those in the foregoing embodiment or components which may be understood easily from the foregoing embodiment, and no detailed description thereof is given below.

Referring to FIG. 8, in an embodiment, a hinge structure 400 may include a first rotator 410 and a first cam 440.

According to an embodiment, the first rotator 410 may include a first rotator body 412, a first guide portion 414, and/or a first interlocking guide 416.

According to an embodiment, the first interlocking guide 416 may include a first vertical portion 4161, a second vertical portion 4162, a first horizontal portion 4163, and/or a second horizontal portion 4164.

According to an embodiment, the first interlocking guide 416 may have an escape portion 4165 that forms an escape section 4165s where a first interlocking protrusion 447 of the first cam 440 is rotated for interlocking between the first cam 440 and the first rotator 410. The escape section 4165s may form at least a portion of a first interlocking hole 416h.

According to an embodiment, the escape portion 4165 may be formed by being depressed from one surface of the second horizontal portion 4164. The escape portion 4165 may be formed by being depressed from one surface (e.g., lower surface) of the second horizontal portion 4164 facing the first horizontal portion 4163. The escape portion 4165 may be depressed from one surface (e.g., lower surface) of the second horizontal portion 4164 so that the height H from the first horizontal portion 4163 to the escape portion 4165 is a preset height H. The height H may be equal to or larger than the diagonal length L of the cross section of a first protrusion shaft 4471 when the first protrusion shaft 4471 is cut along line B-B. The escape portion 4165 may be positioned adjacent to the second vertical portion 4162.

According to an embodiment, the first cam 440 may include a first cam body 442, a first part 444, and/or a second part 446. The second part 446 may have the first interlocking protrusion 447 for interconnecting the first rotator 410 and the first cam 440.

The first interlocking protrusion 447 may allow the first rotator 410 and the first cam 440 to interlock with each other, maintaining the interlocking between the first rotator 410 and the first cam 440. For example, the first interlocking protrusion 447 may be inserted into the first interlocking hole 416h, preventing the first cam 440 from escaping off the first interlocking guide 416. When the first rotator 410 and the first cam 440 are interlocked, the first interlocking protrusion 447 may be rotated within, e.g., the escape section 4165s and then moved along the sliding section. Accordingly, two opposite ends (e.g., 4472a and 4472b (refer to FIG. 10B)) of the first interlocking protrusion 447 may be seated on side surfaces (e.g., 4163a and 4164a) of the first interlocking guide 416.

Referring to FIGS. 9A, 9B, 10A, 10B, and 11, in an embodiment, a first interlocking protrusion 447 may include a first protrusion shaft 4471 and/or a first anti-escape portion 4472.

According to an embodiment, a cross-section of the first protrusion shaft 4471 may have a polygonal shape for strength reinforcement. The cross-section of the first protrusion shaft 4471 cut along line B-B shown in FIG. 9A may have, e.g., a rectangular shape.

According to an embodiment, a reinforcement portion 4471c, 4471d, or 4471e for reinforcing strength may be formed at the start end (e.g., portion D of FIG. 10B) of the first protrusion shaft 4471. The reinforcement portion 4471c, 4471d, or 4471e may be formed on at least one surface of the first protrusion shaft 4471. The reinforcement portion 4471c, 4471d, or 4471e may be formed on an upper surface 4471a and/or a lower surface 4471b of the first protrusion shaft 4471.

According to an embodiment, the reinforcement portion 4471c, 4471d, or 4471e may be formed in various shapes for strength reinforcement. For example, the reinforcement portion 4471c (refer to part (a) of FIG. 11) may be formed to have a predetermined inclination while extending from one surface (e.g., surface 446a) of the second part 446 to one surface 4471a and/or 4471b of the first protrusion shaft 4471. As another example, the reinforcement portion 4471d (refer to part (b) of FIG. 11) may be formed to have a predetermined curvature while extending from one surface (e.g., surface 446a) of the second part 446 to one surface (e.g., 4471a and/or 4471b) of the first protrusion shaft 4471. As another example, the reinforcement portion 4471e (referring to part (c) of FIG. 11) may be formed to have a step from each of one surface (e.g., surface 446b) of the second part 446 and one surface (e.g., 4471a and/or 4471b) of the first protrusion shaft 4471.

Figure 12:
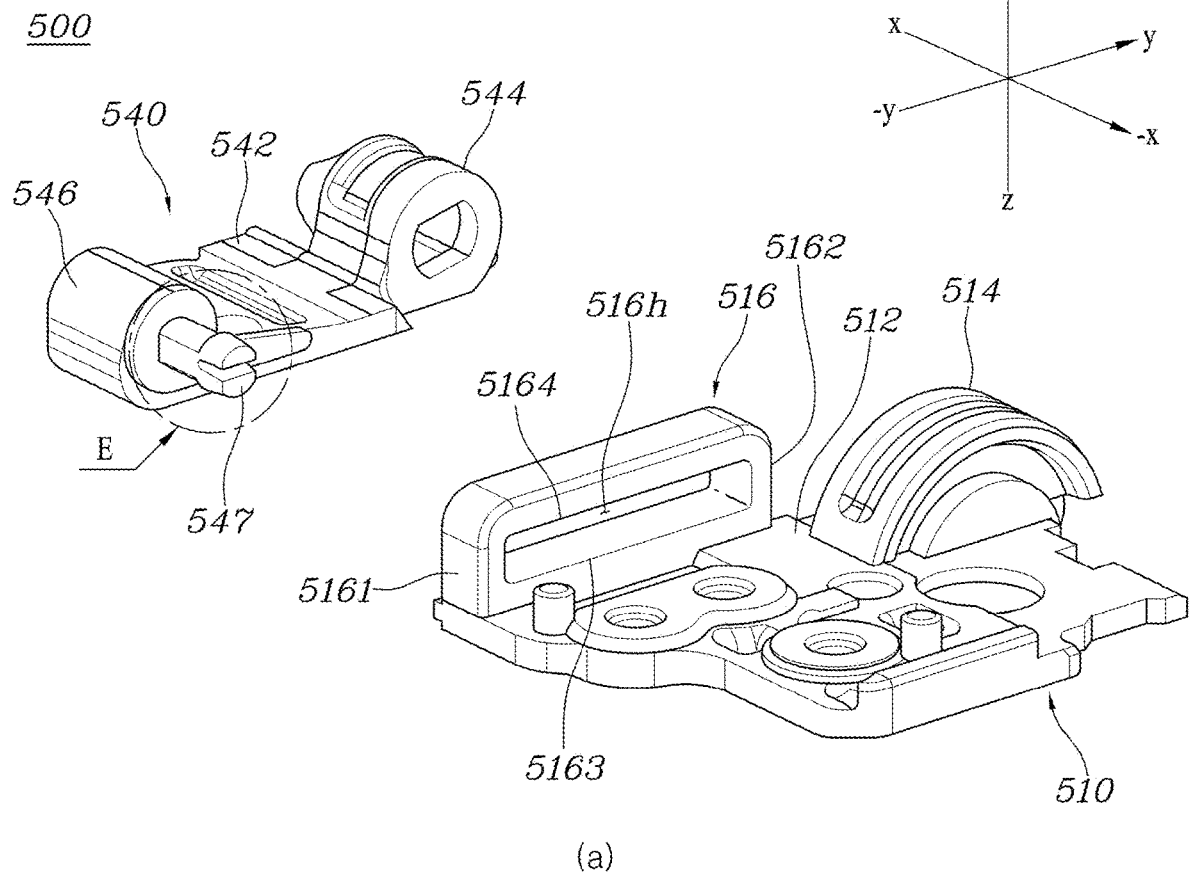
FIG. 12 is an exploded perspective view illustrating a rotator (e.g., first rotator of FIG. 4) and a cam (e.g., first cam of FIG. 4) included in a hinge structure (e.g., hinge structure unit of FIG. 4) according to an embodiment of the disclosure.
Figure 12:
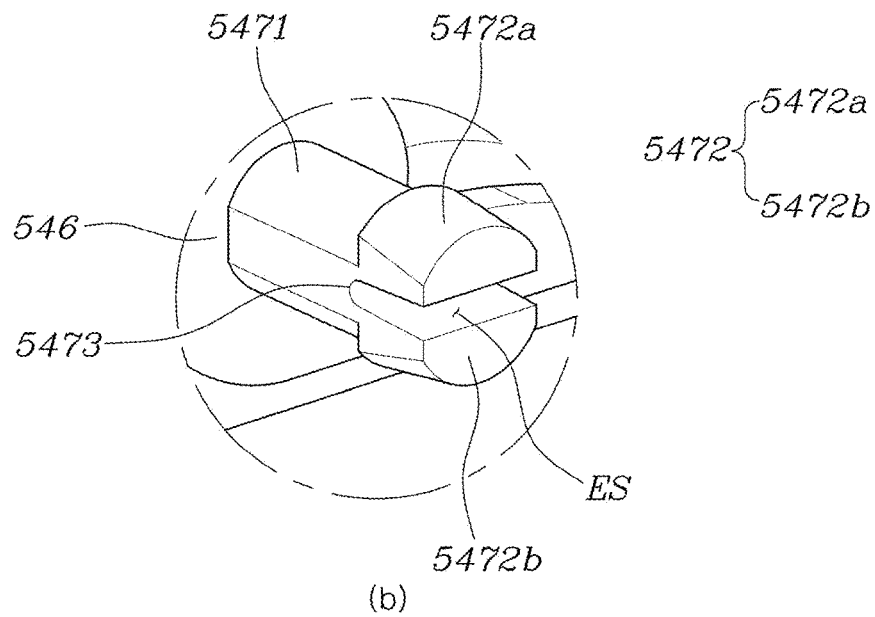

FIG. 12 is an exploded perspective view illustrating a rotator (e.g., a first rotator of FIG. 4) and a cam (e.g., a first cam of FIG. 4) included in a hinge structure (e.g., a hinge structure unit of FIG. 4) according to an embodiment of the disclosure.

Figure 13A:
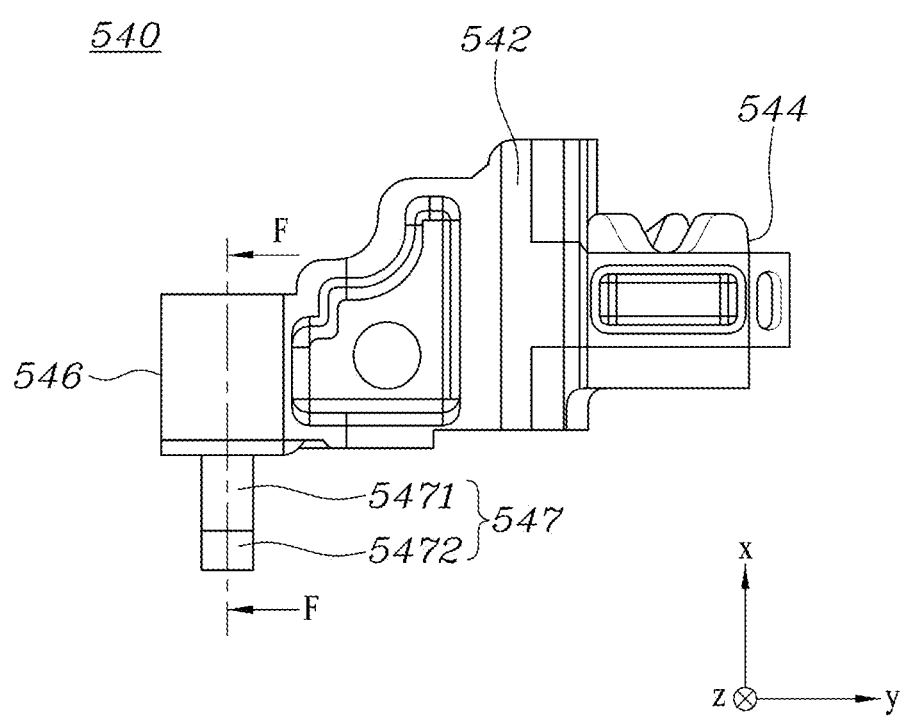
FIG. 13A is a plan view illustrating a first cam of FIG. 12 according to an embodiment of the disclosure.

FIG. 13A is a plan view illustrating a first cam of FIG. 12 according to an embodiment of the disclosure.

Figure 13B:
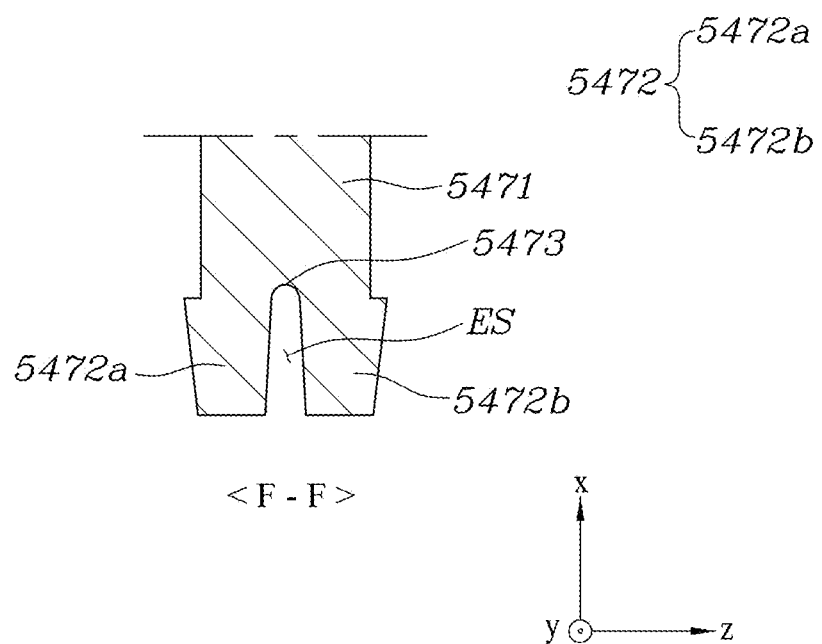
FIG. 13B is a cross-sectional view taken along line F-F of FIG. 13A according to an embodiment of the disclosure.

FIG. 13B is a cross-sectional view taken along line F-F of FIG. 13A according to an embodiment of the disclosure.

In describing the instant embodiment, the foregoing description may be applied to components which are substantially identical or similar to those in the foregoing embodiment or components which may be understood easily from the foregoing embodiment, and no detailed description thereof is given below.

Referring to FIG. 12, in an embodiment, a hinge structure 500 may include a first rotator 510 and/or a first cam 540.

Referring to part (a) of FIG. 12, according to an embodiment, the first rotator 510 may include a first rotator body 512, a first guide portion 514, or a first interlocking guide 516.

The first interlocking guide 516 may include a first vertical portion 5161, a second vertical portion 5162, a first horizontal portion 5163, and a second horizontal portion 5164.

Referring to part (a) of FIG. 12, according to an embodiment, the first cam 540 may include a first cam body 542, a first part 544, and/or a second part 546. The second part 546 may have a first interlocking protrusion 547 for interconnecting the first rotator 510 and the first cam 540.

Referring to part (b) of FIG. 12, which is an exploded view of part E of part (a) of FIG. 12, according to an embodiment, the first interlocking protrusion 547 may include a first protrusion shaft 5471, a first anti-escape portion 5472, and/or an elastic groove 5473.

Referring to FIGS. 12, 13A, and 13B, according to an embodiment, the first anti-escape portion 5472 may include a first end 5472a that extends upward (e.g., −z axis) from an end of the first protrusion shaft 5471 to form a step from the first protrusion shaft 5471 and has an inclined surface that descends in the axial direction (e.g., −x axis) and a second end 5472b that extends downward (e.g., z axis) from an end of the first protrusion shaft 5471 to form a step from the first protrusion shaft 5471 and has an inclined surface that ascends in the axial direction (e.g., x axis). The first end 5472a and the second end 5472b of the first anti-escape portion 5472 may be spaced apart from each other with respect to the elastic groove 5473.

According to an embodiment, the elastic groove 5473 may be configured to impart elasticity to the first anti-escape portion 5472. The elastic groove 5473 may be depressed in the axial direction (e.g., the x-axis) from the first protrusion shaft 5471. The elastic groove 5473 may form an elastic space ES between the first end 5472a of the first anti-escape portion 5472 and the second end 5472b of the first anti-escape portion 5472. The elastic groove 5473, together with the first anti-escape portion 5472, may define the elastic space ES. The elastic space ES may mean a space in which the first anti-escape portion 5472 is deformed/restored by an external force. The size of the elastic space ES may decrease closer to the elastic groove 5473 or increase farther away from the elastic groove 5473. The spacing between the first end 5472a of the first anti-escape portion 5472 and the second end 5472b of the first anti-escape portion 5472 may decrease closer to the elastic groove 5473 or increase farther away from the elastic groove 5473.

Figure 14A:
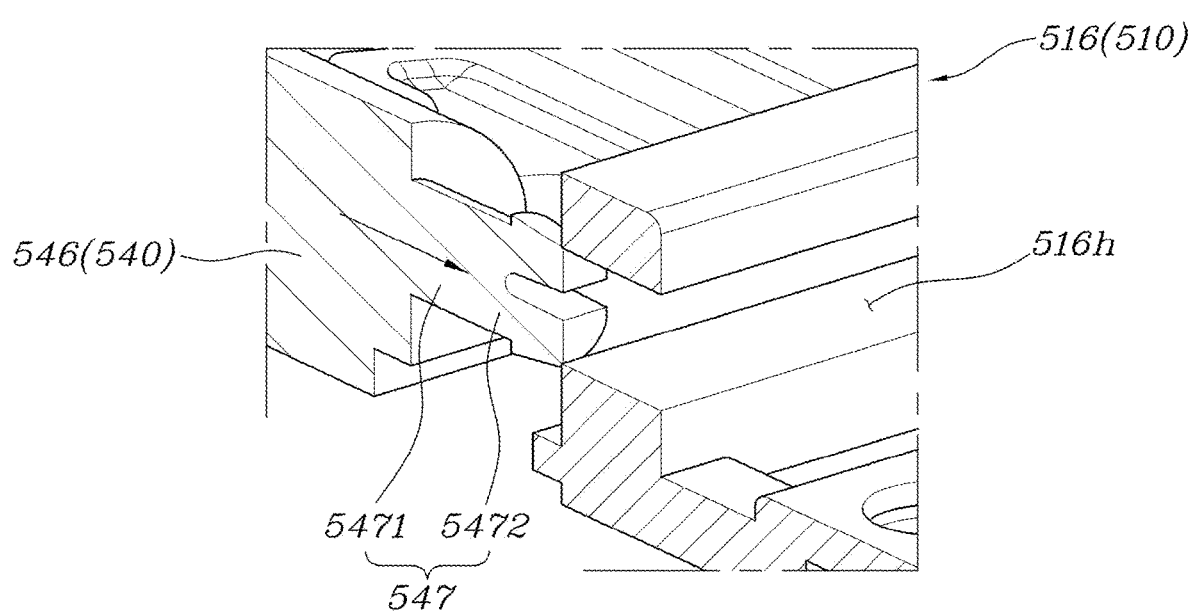
FIGS. 14A, 14B, and 14C are views illustrating assembly of a rotator (e.g., first rotator of FIG. 12) and a cam (e.g., first cam of FIG. 12) included in a hinge structure (e.g., hinge structure of FIG. 12) according to an embodiment of the disclosure.
Figure 14B:
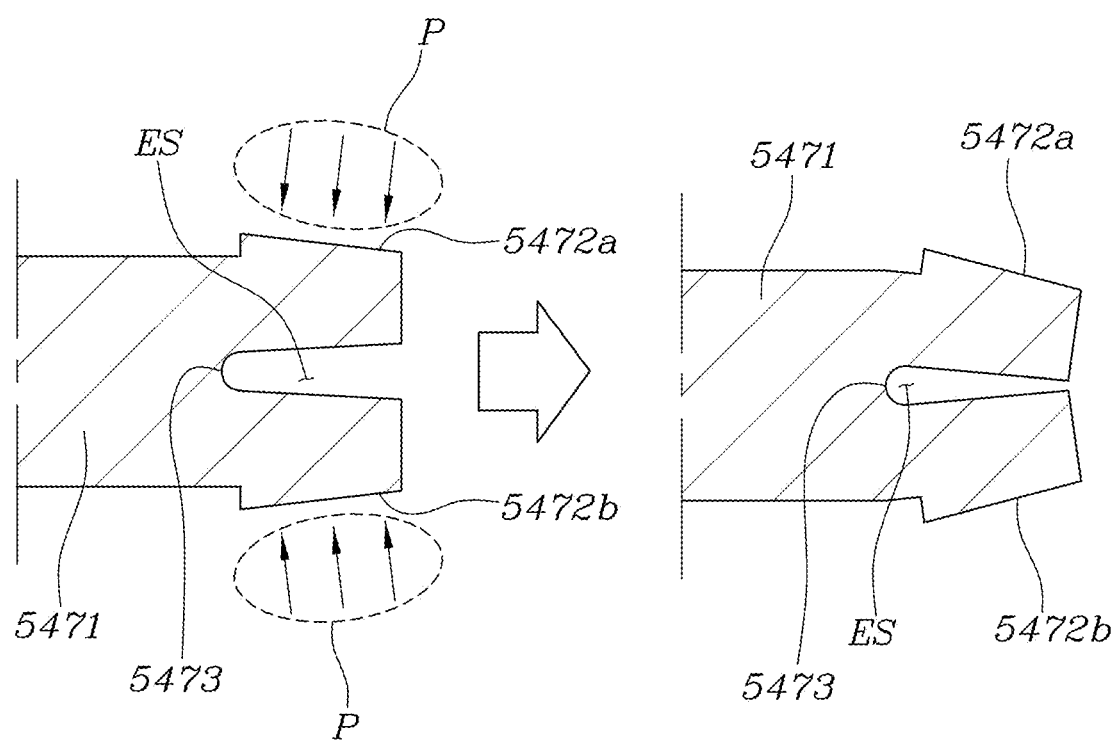
Figure 14C:
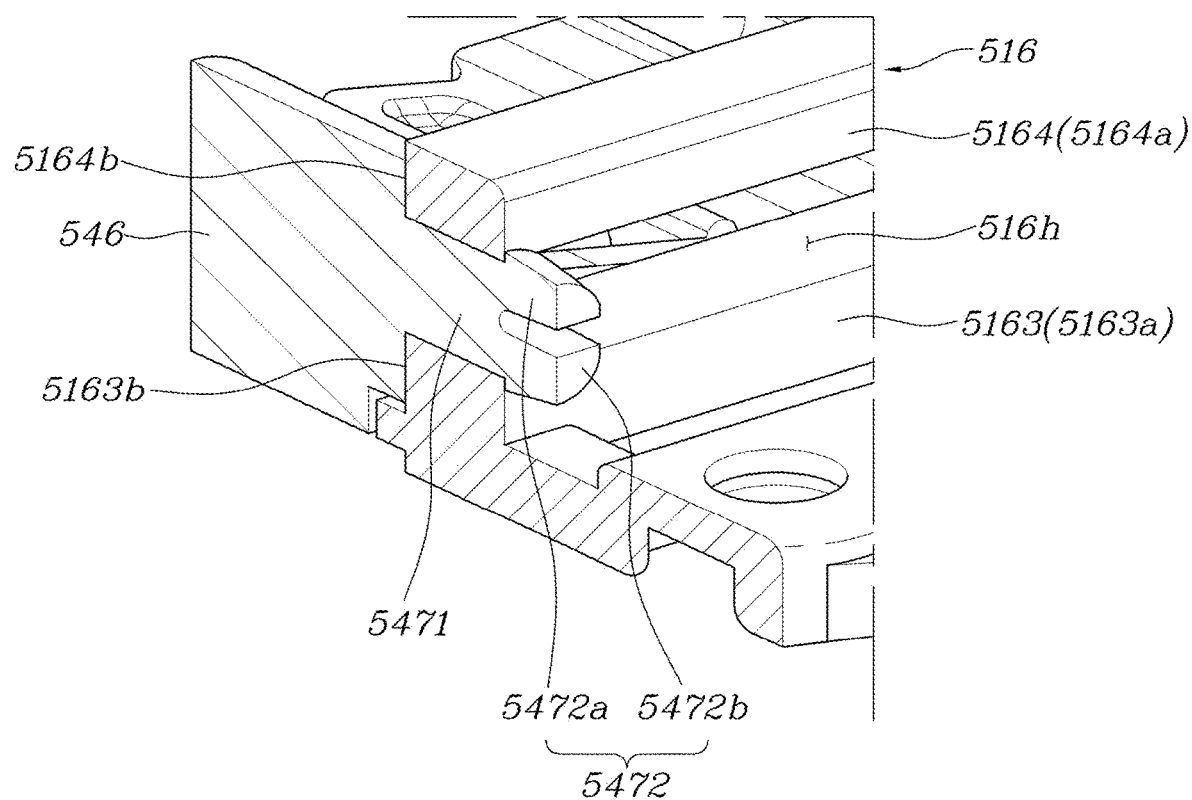

FIGS. 14A, 14B, and 14C are views illustrating assembly of a rotator (e.g., first rotator 510 of FIG. 12) and a cam (e.g., a first cam 540 of FIG. 12) included in a hinge structure (e.g., a hinge structure 500 of FIG. 12) according to an embodiment of the disclosure.

FIG. 14A illustrates a state before the interlocking protrusion (e.g., a first interlocking protrusion 547 of FIG. 12) is assembled into the interlocking hole (e.g., a first interlocking hole 516h of FIG. 12) according to an embodiment of the disclosure.

FIG. 14B illustrates a state deformed to allow the interlocking protrusion (e.g., a first interlocking protrusion of FIG. 12) to be assembled into the interlocking hole (e.g., a first interlocking hole of FIG. 12) according to an embodiment of the disclosure.

FIG. 14C illustrates a state after the interlocking protrusion (e.g., a first interlocking protrusion of FIG. 12) is assembled into the interlocking hole (e.g., a first interlocking hole of FIG. 12) according to an embodiment of the disclosure.

Referring to FIG. 14A, in an embodiment, the first interlocking protrusion 547 of the first cam 540 may be moved to be inserted into a first interlocking hole 516h of the first rotator 510.

Referring to FIG. 14B, in an embodiment, when inserted into the first interlocking hole 516h, the first anti-escape portion 5472 may contact the inner surface of a first interlocking guide 516 and be pressurized towards the elastic space ES by the reaction force P according to the contact. The first end 5472a of the first anti-escape portion 5472 may contact, e.g., a second horizontal portion 5164 of the first interlocking guide 516 and be pressurized towards the elastic space ES by the reaction force P according to the contact. The second end 5472b of the first anti-escape portion 5472 may contact, e.g., a first horizontal portion 5163 of the first interlocking guide 516 and be pressurized towards the elastic space ES by the reaction force P according to the contact. Resultantly, the first anti-escape portion 5472 may be deformed so that the first end 5472a and the second end 5472b are brought closer to each other by the reaction force P according to the contact with the first interlocking guide 516 when inserted while being inserted into the first interlocking hole 516h.

Referring to FIG. 14C, in an embodiment, when the insertion of the first interlocking protrusion 547 into the first interlocking hole 516h is completed, the deformed first anti-escape portion 5472 may be restored to the original shape by the reaction force according to the insertion into the first interlocking hole 516h. When the insertion of the first interlocking protrusion 547 into the first interlocking hole 516h is completed, the first end 5472a of the first anti-escape portion 5472 may abut one side surface 5164a of the second horizontal portion 5164, and the second end 5472b of the first anti-escape portion 5472 may abut one side surface 5163a of the first horizontal portion 5163. Accordingly, the first cam 540 may be prevented from escaping off the first interlocking guide 516 by the first anti-escape portion 5472, and the first rotator 510 and the first cam 540 may be interlocked with each other. Further, when insertion of the first interlocking protrusion 547 into the first interlocking hole 516h is completed, the second part 546 contacts the other side surface (e.g., 5163b or 5164b) of the first interlocking guide 516, so that the second part 546 may support interlocking between the first rotator 510 and the first cam 540.

According to an embodiment of the disclosure, a foldable electronic device (e.g., the foldable electronic device 200 of FIG. 2A) may comprise the hinge structure unit 30 including the first hinge structure 30a and the second hinge structure 30b and a fixing bracket 330 to which the hinge structure unit 30 is rotatably coupled. The first hinge structure 30a or the second hinge structure 30b may include a rotator (e.g., first rotator 310) provided with an interlocking hole (e.g., first interlocking hole 316h) and a cam (e.g., first cam 340) having an end provided with an interlocking protrusion (e.g., first interlocking protrusion 347) to be fitted into the first interlocking hole 316h to be assembled to the first rotator 310.

According to an embodiment of the disclosure, the first interlocking protrusion 347 may include a first protrusion shaft 3471 protruding from the cam and extending in a first direction (-x axis of FIG. 5) which is a length direction of the first interlocking protrusion 347 and the anti-escape portion 3472 extending from an end of the first protrusion shaft 3471 in a second direction (-z axis of FIG. 5) perpendicular to the first direction and a third direction (z axis of FIG. 5) opposite to the second direction and forming a step from the first protrusion shaft 3471.

According to an embodiment of the disclosure, the first interlocking protrusion 347 inserted in the first interlocking hole 316h may be prevented from escaping off the rotator (e.g., first rotator 310) by the step formed in the anti-escape portion 3472 and allow the rotator and the cam (e.g., first cam 340) to interlock with each other to rotate at the same angle during a hinge operation of the foldable electronic device.

According to an embodiment of the disclosure, the protrusion shaft (e.g., the first protrusion shaft 4471 of FIG. 9A) may have a rectangular or polygonal cross section perpendicular to the first direction.

According to an embodiment of the disclosure, the interlocking protrusion (e.g., the first interlocking protrusion 447 of FIGS. 10A and 10B) may further include a reinforcement portion (e.g., the reinforcement portion 4471c, 4471d, or 4471e of FIG. 11) positioned at a start end of the first interlocking protrusion 447 and formed on at least one surface of the first protrusion shaft 4471 to reinforce strength of the first interlocking protrusion 447.

According to an embodiment of the disclosure, the reinforcement portion 4471c may have an inclined surface forming a predetermined angle from the first cam 440 and the first protrusion shaft 4471.

According to an embodiment of the disclosure, the reinforcement portion 4471d may have a curved surface with a center of curvature formed outside the first interlocking protrusion 447.

According to an embodiment of the disclosure, the reinforcement portion 4471e may protrude from the start point of the first interlocking protrusion 447 to form a step from the first protrusion shaft 4471.

According to an embodiment of the disclosure, the anti-escape portion (e.g., the first anti-escape portion 5472 of FIG. 12) may include the first end 5472a inserted into the first interlocking hole 516h and having an inclined surface descending in the first direction (-x axis) and the second end 5472b inserted into the first interlocking hole 516h, spaced apart from the first end 5472a, and having an inclined surface ascending in the first direction (-x axis). The first interlocking protrusion 547 may further include the elastic groove 5473 positioned between the first end 5472a and the second end 5472b, depressed in the first interlocking protrusion 547 in a fourth direction (e.g., x axis of FIG. 12) opposite to the first direction, and forming an elastic space ES where the first end 5472a and the second end 5472b is contracted when the first interlocking protrusion 547 is inserted into the first interlocking hole 516h.

According to an embodiment of the disclosure, a size of the elastic space ES may gradually decrease from an end of the first anti-escape portion 5472 to the elastic groove.

According to an embodiment of the disclosure, the first end 5472a and the second end 5472b of the anti-escape portion may be contracted inward of the elastic space when the interlocking protrusion is inserted into the interlocking hole and, if the insertion of the interlocking protrusion into the interlocking hole is completed, restored to an original shape.

According to an embodiment of the disclosure, the interlocking hole (e.g., the first interlocking hole 316h of FIG. 5) may extend in a left or right direction and form a sliding section where the first interlocking protrusion 347 is moved during the hinge operation of the foldable electronic device.

According to an embodiment of the disclosure, the rotator (e.g., first rotator 310) may include a rotator body (e.g., first rotator body 312) and an interlocking guide (e.g., first interlocking guide 316) formed on one side of the first rotator body 312 and having the first interlocking hole 316h into which the first interlocking protrusion 347 is inserted.

According to an embodiment of the disclosure, the interlocking guide (e.g., the first interlocking guide 416 of FIG. 8) may include an escape portion (e.g., the escape portion 4165 of FIG. 8) depressed from one surface of the first interlocking guide 416 towards the first rotator body 412.

According to an embodiment of the disclosure, the escape portion 4165 may form the escape section 4165s where the first interlocking protrusion 447 inserted in the first interlocking hole 416h is rotated when the hinge structure is assembled.

According to an embodiment of the disclosure, a height H of the escape section may be equal to or larger than a diagonal length L of a cross section of the first protrusion shaft 4471 of the interlocking protrusion perpendicular to a first direction (−x axis) which is a length direction of the first interlocking protrusion 347.

According to an embodiment of the disclosure, a hinge structure (e.g., first hinge structure 30a of FIG. 4) may comprise a bracket (e.g., fixing bracket 330 of FIG. 7A), a rotator (e.g., first rotator 310) rotatably connected to the bracket and provided with an interlocking hole, and a cam (e.g., first cam 340) rotatably connected to the bracket and having an end provided with an interlocking protrusion (e.g., first interlocking protrusion 347) to be fitted into the first interlocking hole 316h to be assembled to the first rotator 310.

According to an embodiment of the disclosure, the first interlocking protrusion 347 may include a first protrusion shaft 3471 protruding from the cam (e.g., first cam 340) and extending in a first direction (−x axis) which is a length direction of the first interlocking protrusion 347 and the anti-escape portion 3472 extending from an end of the first protrusion shaft 3471 in a second direction (−z axis of FIG. 5) perpendicular to the first direction (−x axis) and a third direction (z axis) opposite to the second direction and forming a step from the first protrusion shaft 3471.

According to an embodiment of the disclosure, the first interlocking protrusion 347 inserted in the first interlocking hole 316h may be prevented from escaping off the rotator by the step formed in the anti-escape portion 3472 and allow the rotator (e.g., first rotator 310) and the cam (e.g., first cam 340) to interlock with each other to rotate at the same angle during a hinge operation.

According to an embodiment of the disclosure, the rotator (e.g., first rotator 310) may include a rotator body (e.g., first rotator body 312) and an interlocking guide (e.g., first interlocking guide 316) formed on one side of the rotator body and having the first interlocking hole 316h into which the first interlocking protrusion 347 is inserted.

According to an embodiment of the disclosure, the interlocking protrusion 347 may comprise a protrusion shaft 3471 protruding from the cam and extending in a first direction, the first direction being a length direction of the interlocking protrusion 347, and a length of the protrusion shaft 3471 may be equal to a thickness of the interlocking guide 316.

According to an embodiment of the disclosure, while the interlocking protrusion 347 is completely inserted into the interlocking hole 316h, a first end of the anti-escape portion 3472 may contact a side surface of a horizontal portion 3164 of an interlocking guide 316 of the rotator 310 to prevent the interlocking protrusion 347 from escaping off the interlocking guide 316.

According to an embodiment of the disclosure, the rotator 310 may be movable in an oblique direction to slide the interlocking protrusion 347 along the interlocking hole 316h, and after sliding the interlocking protrusion 347 along the interlocking hole 316h, the rotator 310 may be rotatable in a clockwise direction so that a guide portion 314 of the rotator 310 is inserted into a guide groove formed in the bracket 330.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1$^{st}$" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
   a first housing;
   a second housing;
   a hinge structure foldably coupled between the first housing and the second housing; and
   a flexible display supported by the first housing and the second housing,
   wherein the hinge structure comprises:
      a bracket,
      a rotator rotatably connected to the bracket and including an interlocking hole, and
      a cam having an interlocking protrusion provided at an end of the cam and fitted into the interlocking hole to be assembled to the rotator, and
   wherein the interlocking protrusion comprises:
      a protrusion shaft integrally protruding from the cam and extending in a first direction, and
      an anti-escape portion integrally extending from an end of the protrusion shaft in a second direction and a third direction opposite to the second direction, the second direction and the third direction being perpendicular to the first direction.

2. The foldable electronic device of claim 1, wherein, while the interlocking protrusion is completely inserted in the interlocking hole, the interlocking protrusion is prevented from escaping off the rotator by a step formed in the anti-escape portion and allows the rotator and the cam to interlock with each other to rotate at a same angle during a hinge operation of the foldable electronic device.

3. The foldable electronic device of claim 1, wherein the protrusion shaft comprises a rectangular or polygonal cross section perpendicular to the first direction.

4. The foldable electronic device of claim 1, wherein the interlocking protrusion further comprises a reinforcement portion positioned at a start end of the interlocking protrusion and formed on at least one surface of the protrusion shaft to reinforce strength of the interlocking protrusion.

5. The foldable electronic device of claim 1,
   wherein the anti-escape portion comprises:
      a first end configured to be inserted into the interlocking hole and having an inclined surface descending in the first direction; and
      a second end configured to be inserted into the interlocking hole, spaced apart from the first end, and having an inclined surface ascending in the first direction,
   wherein the interlocking protrusion further includes an elastic groove positioned between the first end and the second end,
   wherein the elastic groove forms an elastic space where the first end and the second end is contracted when the interlocking protrusion is inserted into the interlocking hole, and
   wherein the first end and second end are configured to be pushed closer together by an interlocking guide including the interlocking hole when the interlocking protrusion is inserted into the interlocking hole.

6. The foldable electronic device of claim 5, wherein a size of the elastic space gradually decreases from an end of the anti-escape portion to the elastic groove.

7. The foldable electronic device of claim 5,
   wherein the first end and the second end of the anti-escape portion are contracted inward of the elastic space when the interlocking protrusion is inserted into the interlocking hole, and
   wherein, based on the interlocking protrusion being completely inserted into the interlocking hole, the first end and the second end of the anti-escape portion are restored to an original shape.

8. The foldable electronic device of claim 1, wherein the interlocking hole extends in a left or right direction and forms a sliding section where the interlocking protrusion is moved during a hinge operation of the foldable electronic device.

9. The foldable electronic device of claim 1, wherein the rotator further includes:
   a rotator body; and
   an interlocking guide formed on one side of the rotator body and having the interlocking hole into which the interlocking protrusion is inserted.

10. The foldable electronic device of claim 9, wherein the interlocking guide includes an escape portion depressed from one surface of the interlocking guide towards the rotator body.

11. The foldable electronic device of claim 10, wherein the escape portion forms an escape section where the interlocking protrusion inserted in the interlocking hole is rotated when the hinge structure is assembled.

12. The foldable electronic device of claim 11, wherein a height of the escape section is equal to or larger than a diagonal length of a cross section of the protrusion shaft of the interlocking protrusion perpendicular to the first direction, the first direction being a length direction of the interlocking protrusion.

13. The foldable electronic device of claim 1, wherein the protrusion shaft and the anti-escape portion of the interlocking protrusion are integrally formed with the cam to form the cam as a single integral component.

14. A hinge structure comprising:
a bracket;
a rotator rotatably connected to the bracket and comprising an interlocking hole; and
a cam rotatably connected to the bracket and having an interlocking protrusion provided at an end of the cam and fitted into the interlocking hole to be assembled to the rotator,
wherein the interlocking protrusion comprises:
a protrusion shaft integrally protruding from the cam and extending in a first direction, and
an anti-escape portion integrally extending from an end of the protrusion shaft in a second direction and a third direction opposite to the second direction, the second direction and the third direction being perpendicular to the first direction.

15. The hinge structure of claim 14, wherein, while the interlocking protrusion is completely inserted in the interlocking hole, the interlocking protrusion is prevented from escaping off the rotator by a step formed in the anti-escape portion and allows the rotator and the cam to interlock with each other to rotate at a same angle during a hinge operation.

16. The hinge structure of claim 14, wherein the rotator further comprises:
a rotator body; and
an interlocking guide formed on one side of the rotator body and having the interlocking hole into which the interlocking protrusion is inserted.

17. The hinge structure of claim 16,
wherein the first direction is a length direction of the interlocking protrusion, and
wherein a length of the protrusion shaft is equal to a thickness of the interlocking guide.

18. The hinge structure of claim 14, wherein, while the interlocking protrusion is completely inserted into the interlocking hole, a first end of the anti-escape portion contacts a side surface of a horizontal portion of an interlocking guide of the rotator to prevent the interlocking protrusion from escaping off the interlocking guide.

19. The hinge structure of claim 14,
wherein the rotator is movable in an oblique direction to slide the interlocking protrusion along the interlocking hole, and
wherein, after sliding the interlocking protrusion along the interlocking hole, the rotator is rotatable in a clockwise direction so that a guide portion of the rotator is inserted into a guide groove formed in the bracket.

* * * * *